(12) United States Patent
Salas

(10) Patent No.: US 6,572,053 B2
(45) Date of Patent: Jun. 3, 2003

(54) FLYING VEHICLE OF INVERSE SUSTENTATION (FVIS)

(76) Inventor: Americo Salas, Avenida Venezuela P3-B Urb. Ucchullo, Peru Cusco (PE)

( * ) Notice: Subject to any disclaimer, the term of this patent is extended or adjusted under 35 U.S.C. 154(b) by 0 days.

(21) Appl. No.: 09/801,464

(22) Filed: Mar. 8, 2001

(65) Prior Publication Data

US 2002/0125366 A1 Sep. 12, 2002

(30) Foreign Application Priority Data

Sep. 19, 2000 (PE) ................................. 000966-2000/01N

(51) Int. Cl.[7] ........................... B64C 29/02; B64C 39/06
(52) U.S. Cl. ................... 244/12.2; 244/23 C; 244/73 C
(58) Field of Search ............................. 244/12.2, 23 C, 244/34 A, 73 C, 207

(56) References Cited

U.S. PATENT DOCUMENTS

| | | | | |
|---|---|---|---|---|
| 3,397,853 A | * | 8/1968 | Richardson, Sr. | 244/23 C |
| 3,592,413 A | * | 7/1971 | Thompson | 244/12.2 |
| 3,697,020 A | * | 10/1972 | Thompson | 244/12.2 |
| 4,519,562 A | * | 5/1985 | Willis | 244/207 |
| 5,170,963 A | * | 12/1992 | Beck, Jr. | 244/12.2 |
| 5,303,879 A | * | 4/1994 | Bucher | 244/23 C |
| 5,407,150 A | * | 4/1995 | Sadleir | 244/12.4 |
| 6,073,881 A | * | 6/2000 | Chen | 244/23 C |
| 6,113,029 A | * | 9/2000 | Salinas | 244/23 C |

* cited by examiner

Primary Examiner—Robert P. Swiatek
(74) Attorney, Agent, or Firm—Pendorf & Cutliff

(57) ABSTRACT

The Flying Vehicle of Inverse Sustentation (FVIS) is an air transport unit for passengers and cargo. The vehicle comprises a main flow generating unit to burn a mixture of fuel and air and produce a gas flow with an appropriate speed to achieve the force of sustentation, an air admission duct to receive the flow generated by the flow generating unit, the admission duct having a circular duct with a narrow exit to produce high speed flow, a circular wing to directly receive the high speed flow and produce the necessary force for sustentation and elevation of the vehicle vertically, the circular wing having a transverse profile and an angle of attack divided in four sections, the circular wing being able to move at least one of independently and synchronized for each of the four sections in which it is divided, a protective cover to protect the circular wing and direct the flow to the interior part of the vehicle, at least one secondary propulsion unit for helping with the horizontal displacement of the vehicle, each secondary propulsion unit is installed at least in one of top and side of the vehicle, a cockpit for transporting passengers. The maneuverability and stability of the vehicle can be changed by changing the angle of attack of each section of the circular wing.

21 Claims, 24 Drawing Sheets

WING MODIFIED SECTION WITH MORE SUSENTATION SURFACE

FLYING VEHICLE OF INVERSE SUSTENTATION (FVIS)

BACKGROUND OF THE INVENTION

1. Field of the Invention

This invention relates to an air transport unit for passengers and cargo. More specifically, the present invention is concern with an air transportation unit that has a vertical takeoff and horizontal displacement.

2. Description of the Related Art

The field of aeronautics is very extensive. Airplanes elevate because of the action of the displacement of the vehicle wings, that when impacted on the atmospheric air, generate current lines on and under the wing producing a mass concentration of air between both sides of the wing. Thus, a sustentation force of vertical direction elevates the vehicle.

The wing has a wider border in the superior part, and an attack angle, given by the wing regarding a horizontal plane (FIG. 1). This design produces the separation of the air in current lines with more concentration in the inferior part of the wing, which makes the airplane elevate. Unfortunately, airplanes design has the inconvenience that it requires to move horizontally to reach the speed of sustentation and its sustentation force.

In the screw propeller of a helicopter, something similar happens. In this case, the screw propellers impact on the air to cause the sustentation force for achieving the takeoff. As in the case of the airplane, the screw propellers of the helicopter have in their section a tear form, and they impact on the air with an attack angle controlled by the pilot in the cockpit.

Because of the position of the screw propeller in a horizontal plane, it is posible for helipcopter to vertically takeoff, which overcome the problem of a runway for taking off or landing. However, the helicopter, for its design limitations, doesn't have good capacity in the cargo bay. The screw propellers are not big enough for sustentation (as compare with the airplane). Moreover, its speed is not the same as the airplane, since the rotation of the main screw propeller, when advancing, cannot lean too much without losing sustentation.

The ascension speed in the helicopter is determined by the speed of rotation of the screw propellers and the attack angle.

Another invention that could be taken as a reference is the vehicle of surface effect, such as amphibian vehicles, used basically in marine transport. This vehicle moves on a mattress of generated air and maintained in the space between the helmet and the water surface or floor, on which it moves or remains stationary (FIG. 2).

Some of these vehicles have a considerable load and speed, U.S Navy JEFF-B (ACV) that loads150 tons to 50 knots, using 6-TF-40 of 2498 kW motors to 15400 rpm for its propulsion and rising 2 screw propellers in ducts of air of 12 feet (3.66 m) of diameter to 1250 rpm and 4 centrifugal fans of double entrance to 1900 rpm. However, since these vehicles require a mattress of air between the helmet and the water or floor, they are only able to rise to a small height.

The well-known British airplane of vertical takeoff "British Sea Harrier," is an airship with approximately 30 years of existence. The Sea Harrier has four nozzles to exit gases of the jet engine, two of which are firm and two of mobile position with which can rise vertically. A problem presented by the Sea Harrier is that requires great power in the takeoff and is very difficult for maneuvering. (FIG. 3b).

Finally, the vehicle B22 (FIG. 3a), developed at a great cost by the Defense Department of the United States, develops a speed of 230 knots and has a capacity to load 4000 Kg.

Thus, the present inventor feels the necessity of providing an air vehicle with superior qualities to those of the prior art that can have a vertical takeoff and horizontal displacement, has a large load capacity and is economical to produce.

BRIEF SUMMARY OF THE INVENTION

The present invention combines the best qualities of a helicopter with the best qualities of an airplane. The air vehicle according to the present invention does not have limitations on speed, altitude, or load capacity as the helipcopter. The air vehicle according to the present invention does not have the requirements for the taking off and landing of the airplanes because it can take off vertically.

The present invention provides an inverse sustentation air transport vehicle for passengers and cargo, the vehicle comprising:

- a main flow generating unit to burn a mixture of fuel and air and produce a flow with an appropriate speed to archive the force of sustentation;
- an air admission duct to receive the flow generated by the flow generating unit, the admission duct having a circular duct with a narrow exit to produce high speed flow;
- a circular wing to directly receive the high speed flow and produce the necessary force for sustentation and elevation of the vehicle vertically, the circular wing having a traverse profile and an angle of attack divided in four sections, the circular wing being able to move independently or synchronized for each of the four sections in which it is divided;
- a protective cover to protect the circular wing and direct the flow to the inferior part of the vehicle;
- a secondary unit of propulsion for helping with the horizontal displacement of the vehicle, the secondary propulsion units installed on top or side of the vehicle;
- a cockpit for transporting passengers;
- wherein the maneuverability and stability of the vehicle can be changed by changing the angle of attack of each section of the circular wing.

The air transport vehicle according to the present invention has a main flow-generating unit or combustion gases, which is directed toward a circled firm wing, with the purpose of obtaining the necessary sustentation to elevate it. The flow directed toward the wing is protected with a cover with the surrounding means. The horizontal displacement is obtained using secondary propulsion units.

The load capacity will be given by the power of the main propulsion unit of the vehicle that will be selected according to the requirements or applications. The speed will only depend on the secondary propulsion units chosen. For a bigger vehicle, it would be possible to use two or more main propulsion units.

The maneuverability provided by the design of the air transport vehicle (FVIS) according to the present invention is superior to any of the air vehicle of the prior art. Its versatility allows to add the accessories that are necessary to overcome the maneuverability of the helicopter or the airplane when it is required.

The proposed invention represents a vehicle of air transport with superior qualities to those of an airplane because it eliminates the necessity to move horizontally for taking off or, to those of the helicopter because it doesn't have the design limitations that block lifting an important load, neither the limitations of the same one to acquire a high displacement speed or to reach a considerable altitude.

The Flying Vehicle of Inverse Sustentation according to the present invention is of a simple, easy construction that requires few elements and very few mobile parts. The air transport vehicle is made with slight materials commonly used in the production of airships and it has a very lightweight.

The manufacture of the air transport vehicle is inexpensive, thus can fulfill the need of civil transport to a considerable population sector. The use of the present invention in military applications is very broad, because it is more versatile and efficient than the air vehicles of the prior art.

The FVIS does not have the impediment of load capacity as the helicopter, thus it will be able to carry emergency elements such as parachutes for the cockpit or the vehicle, using well-known systems for screw ejection and parachute unfolding (FIG. 4).

At the same time, because of the condition of the sustentation elements, a more compact structure can be used instead of a helicopter or an airplane.

The foregoing has outlined rather broadly the more pertinent and important features of the present invention in order that the detailed description of the invention that follows may be better understood, and the present contribution to the art can be more fully appreciated. Additional features of the invention will be described hereinafter, which form the subject of the claims of the invention. It should be appreciated by those skilled in the art that the conception and the specific embodiments disclosed may be readily utilized as a basis for modifying other security systems for carrying out the same purposes of the present invention. It should also be realized by those skilled in the art that such equivalent structures do not depart from the spirit and scope of the invention as set forth in the appended claims.

BRIEF DESCRIPTION OF THE DRAWING VIEWS

For a fuller understanding of the nature and objects of the invention, reference should be made to the following detailed description taken in connection with the accompanying drawings in which.

Figure 1:
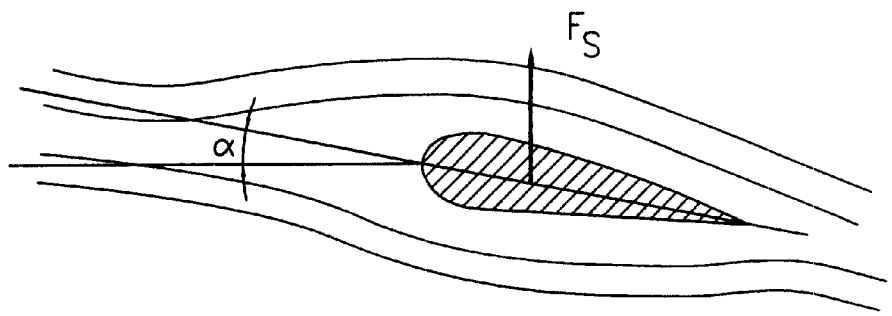
FIG. 1 illustrates the section of an airplane wing.
Figure 2A:
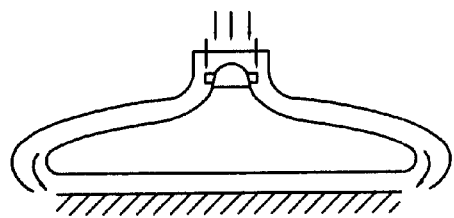
FIGS. 2a–2d illustrates the sectional outline of some vehicles of surface effect. surface effect FIGS. 3a, and 3b—illustrates air transport vehicles according to the prior art.
Figure 2B:
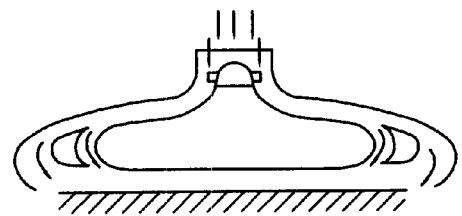
Figure 2C:
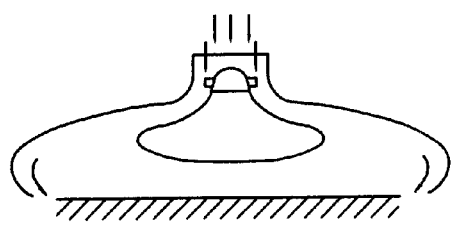
Figure 2D:
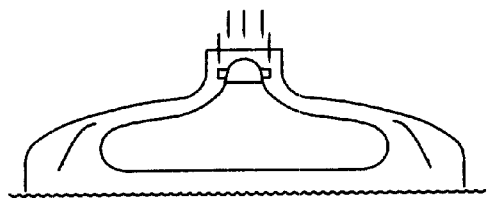
Figure 3A:
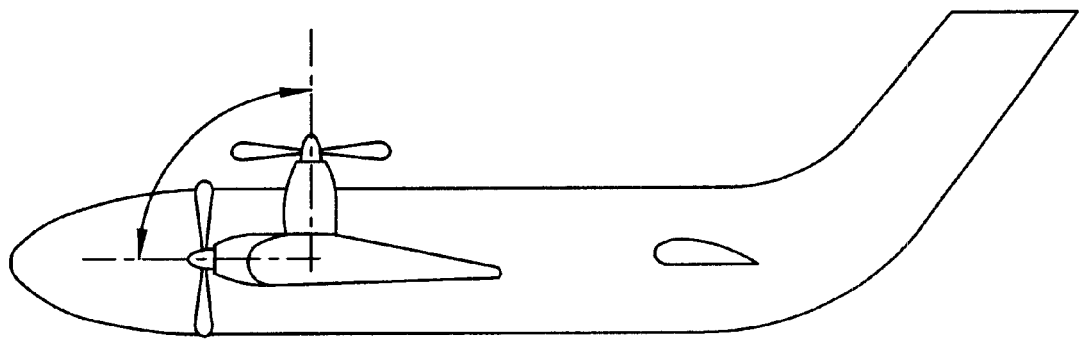
Figure 3B:
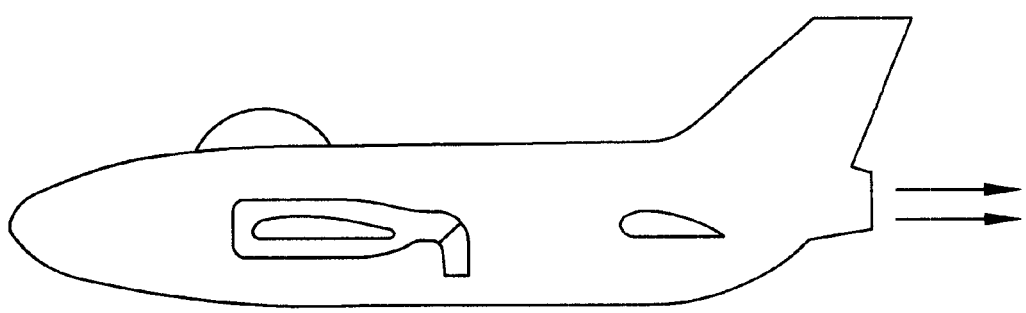
Figure 4A:
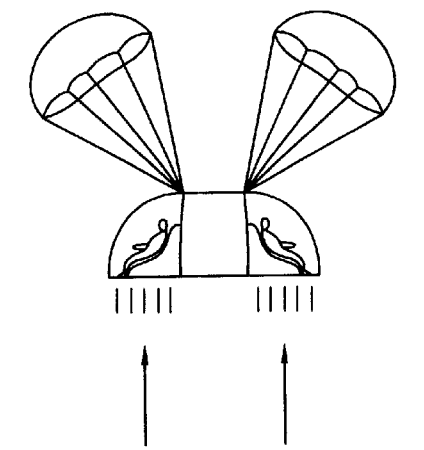

FIG. 4a—illustrates the present invention showing the ejection of the complete cockpit including a security system.

Figure 4B:
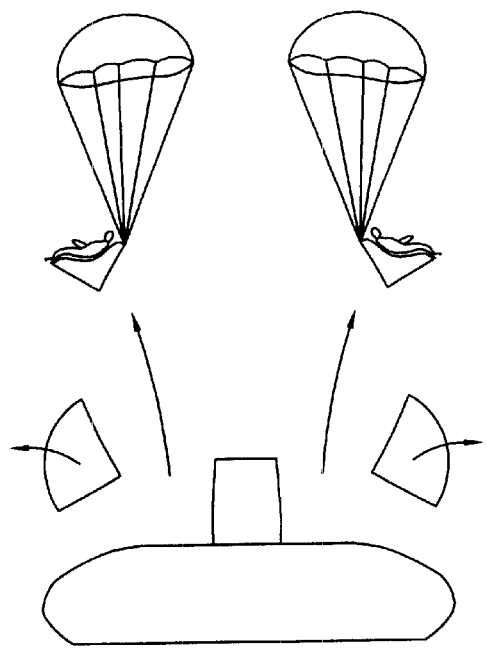

FIG. 4b—illustrates the present invention showing the individual passanger ejection including a security system.

Figure 4C:
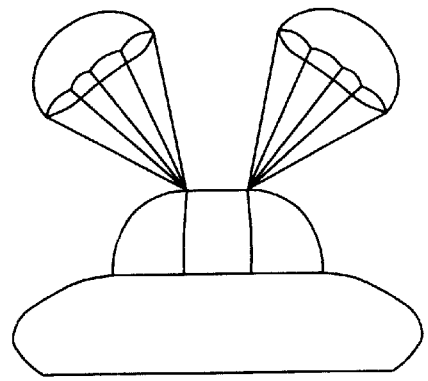

FIG. 4c—illustrates the present invention showing the the landing of the complete vehicle including a security system.

Figure 5:
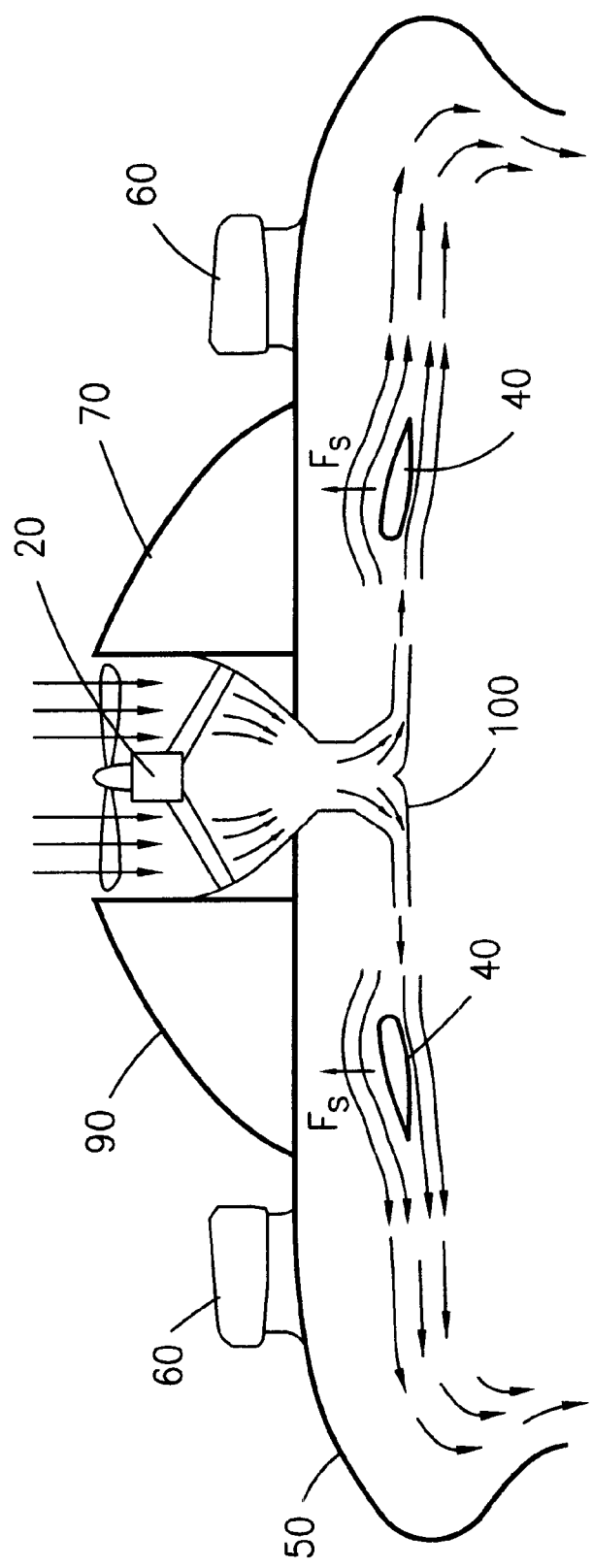

FIG. 5—illustrates a section view of the air transportation vehicle according to the present invention.

Figure 6A:
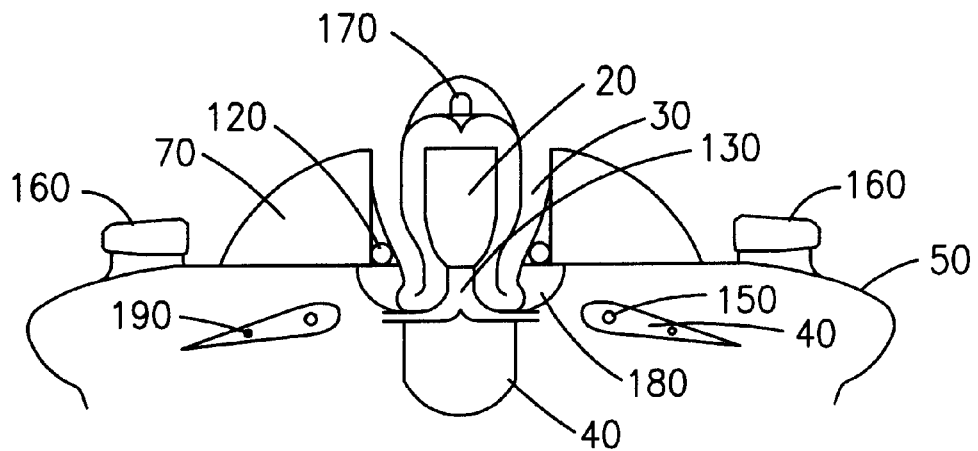

FIG. 6a—illustrates a sectional view of the air transportation vehicle according to the present invention using a jet engine line a flow-generating plant of escape gases for the sustentation.

Figure 6B:
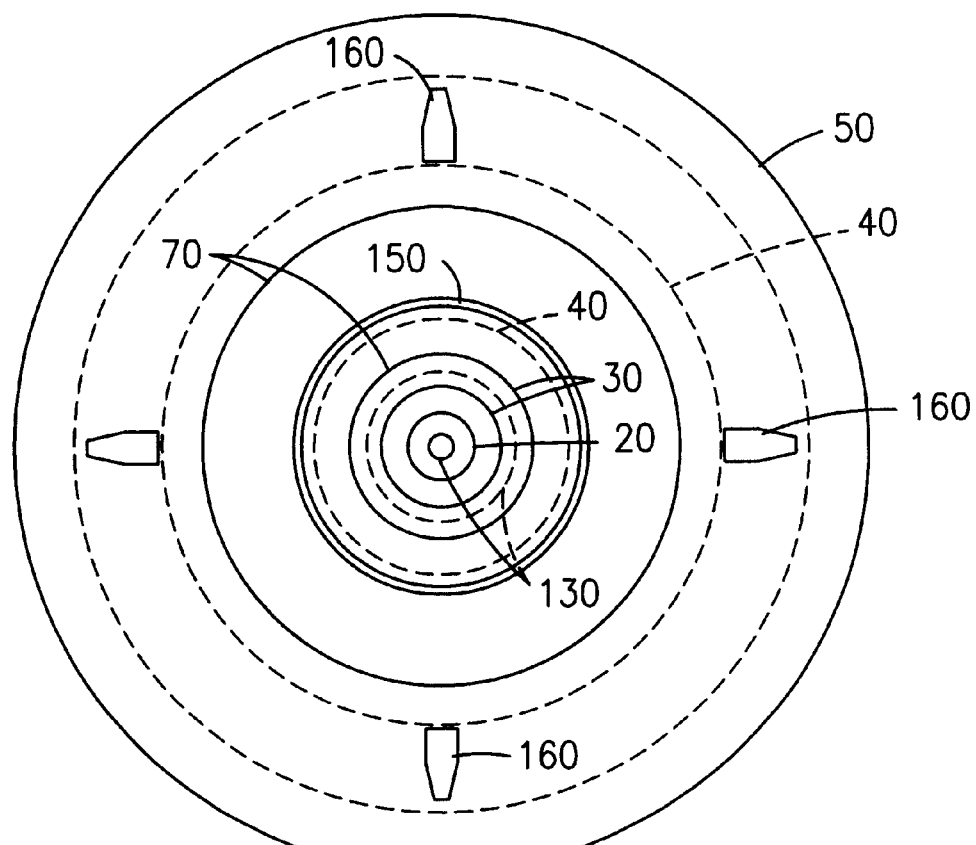

FIG. 6b—illustrates a top view of the air transportation vehicle according to the present invention using a jet engine like a flow-generating plant of escape gases for the sustentation.

Figure 7A:
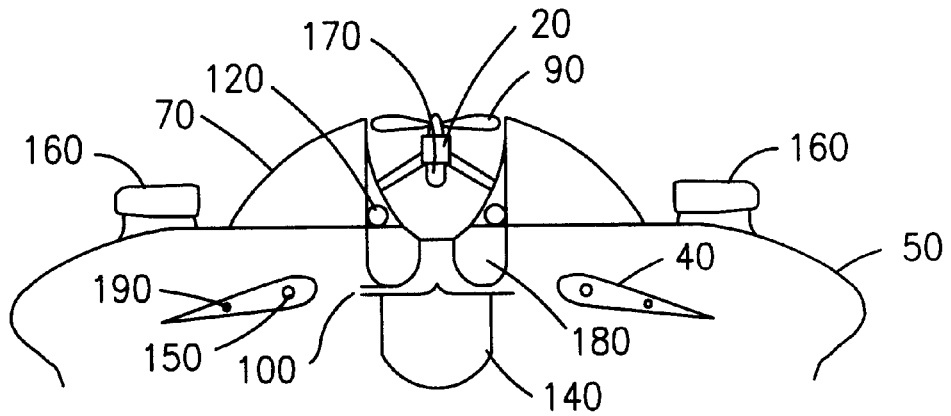

FIG. 7a—illustrates a sectional view of the air transportation vehicle according to the present invention using an aeronautical motor of internal combustion as an airflow generating plant for the sustentation.

Figure 7B:
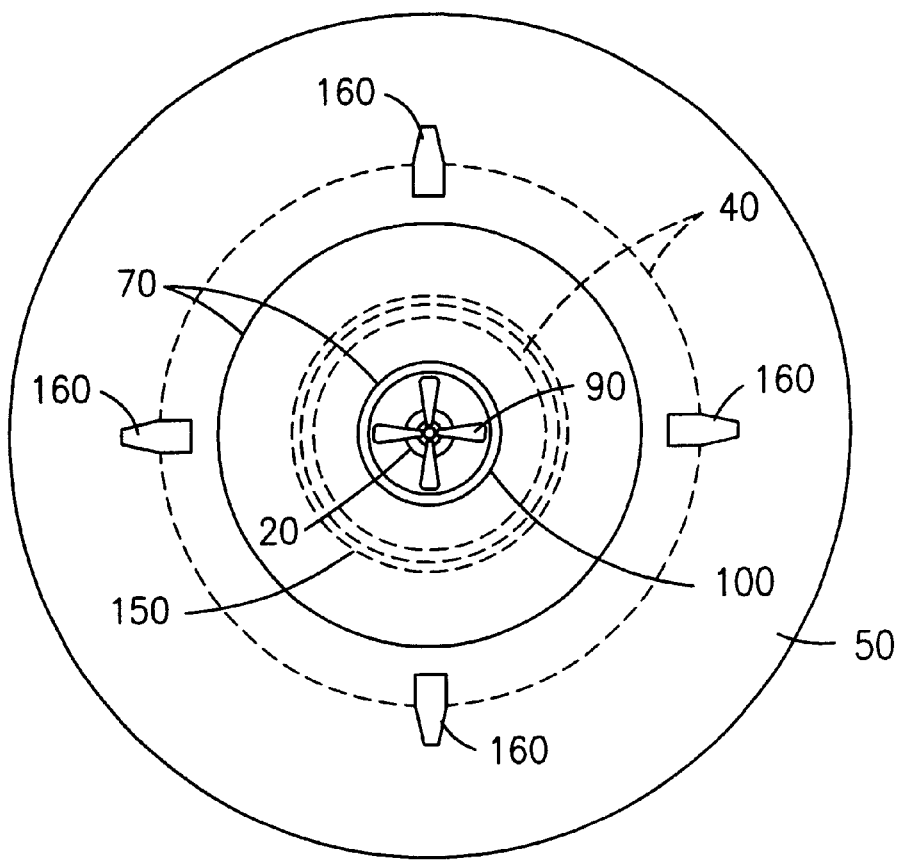

FIG. 7b—illustrates a top view of the air transportation vehicle according to the present invention using using an aeronautical motor of internal combustion as an airflow generating plant for the sustentation.

Figure 8A:
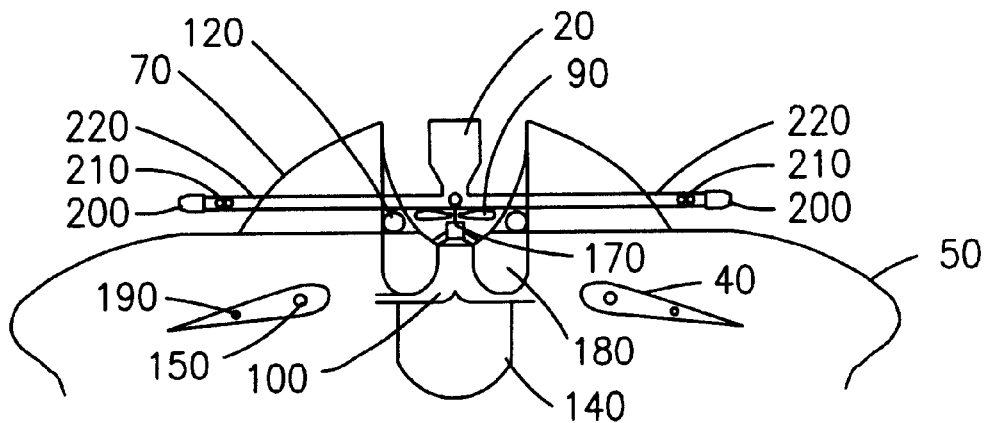

FIG. 8a—illustrates a sectional view of the air transportation vehicle according to the present invention using a jet engine as an airflow-generating plant for sustentation.

Figure 8B:
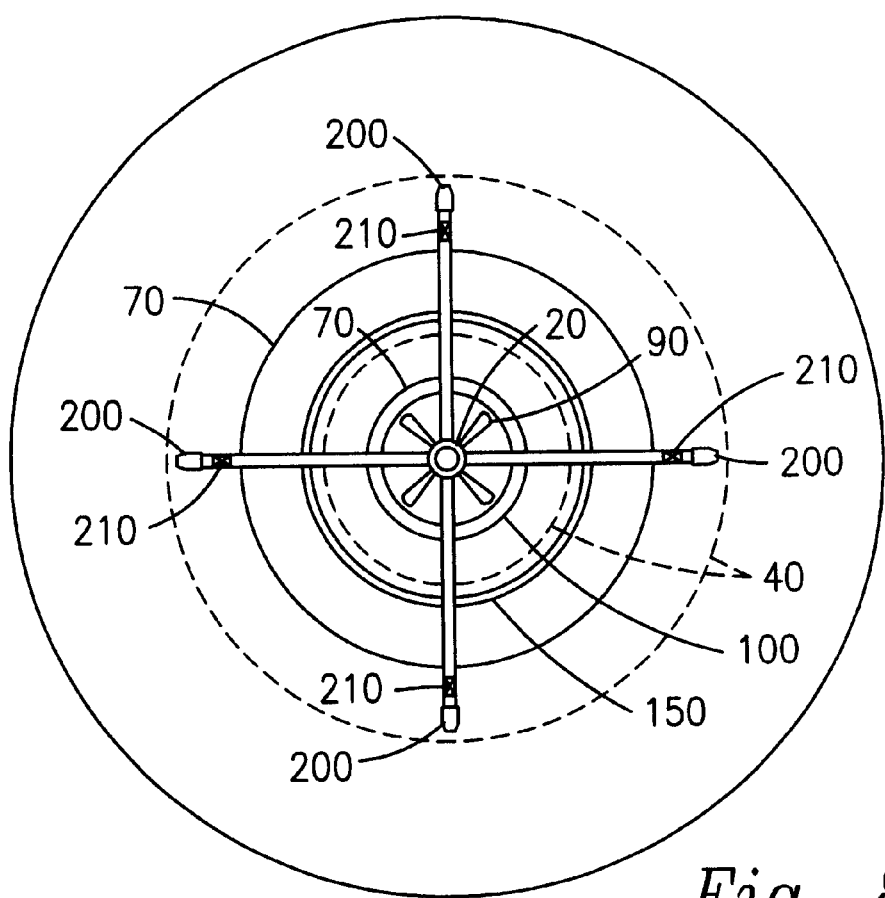

FIG. 8b—illustrates a top view of the air transportation vehicle according to the present invention using a jet engine as an airflow-generating plant for sustentation.

Figure 9A:
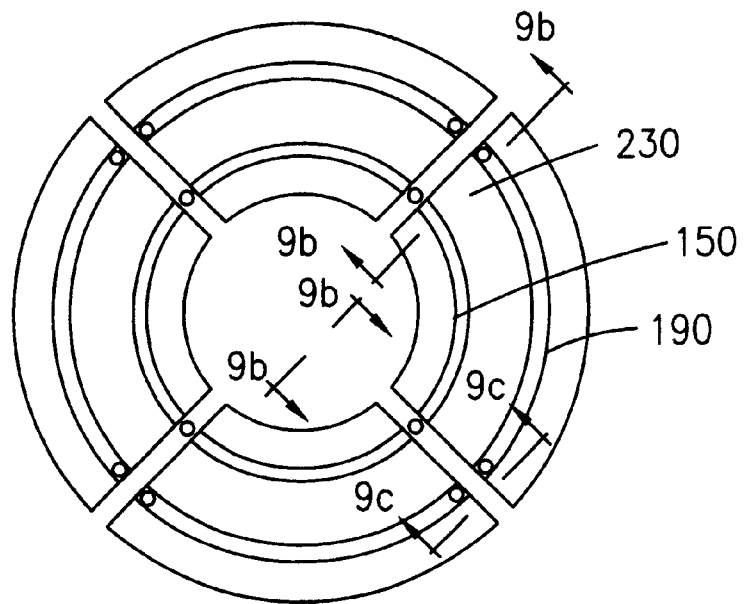

FIG. 9a—illustrates a top view of the circular wing.

Figure 9B:
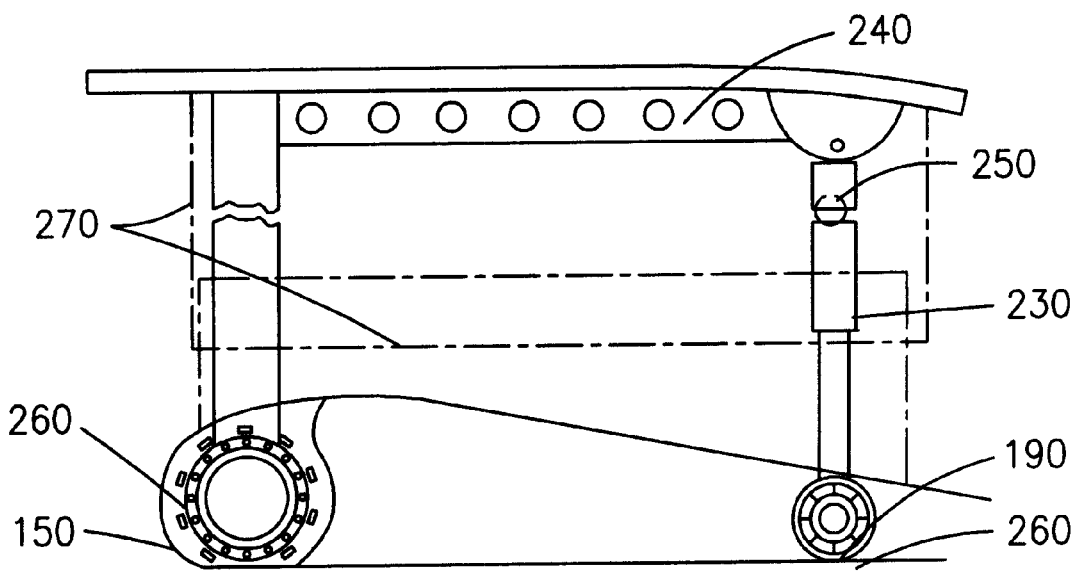

FIG. 9b—illustrates a sectional view of FIG. 9a taken along lines A–A'.

Figure 9C:
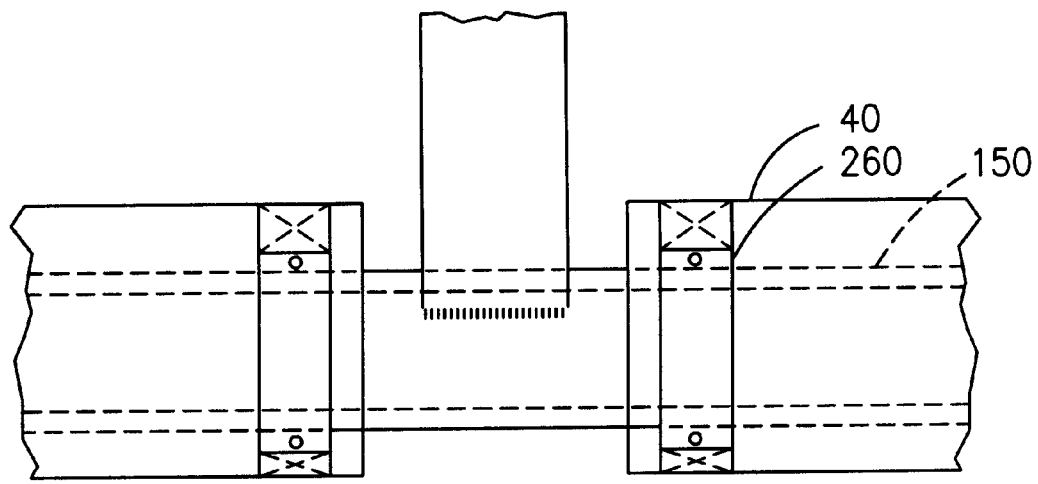

FIG. 9c—illustrates a sectional view of FIG. 9a taken along lines B–B'.

Figure 9D:
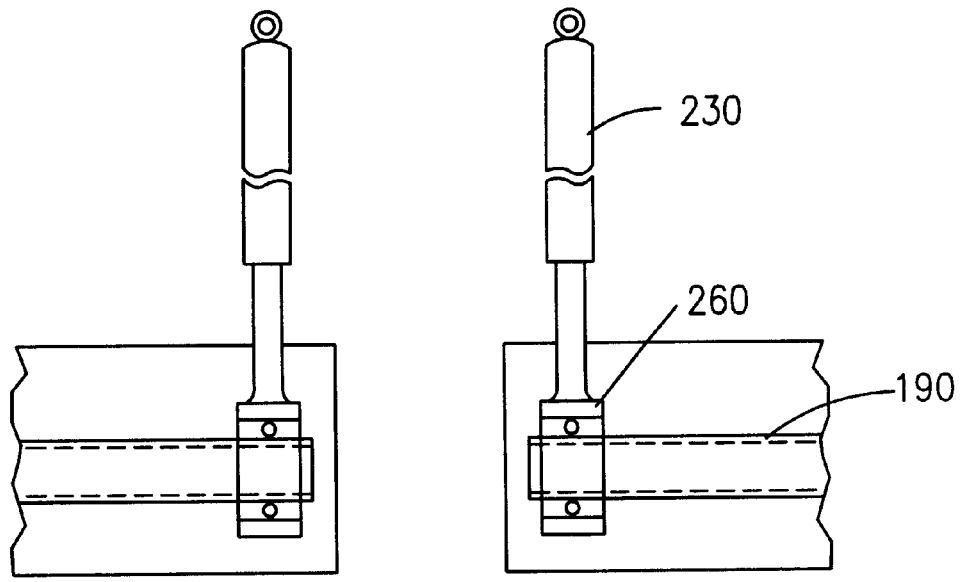

FIG. 9d—illustrates a sectional view of FIG. 9a taken along lines C–C'.

Figure 10:
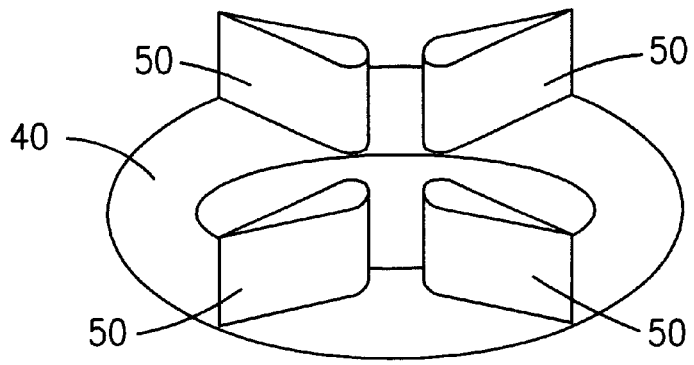

FIG. 10—illustrates the circular wing having four protective covers.

Figure 11A:
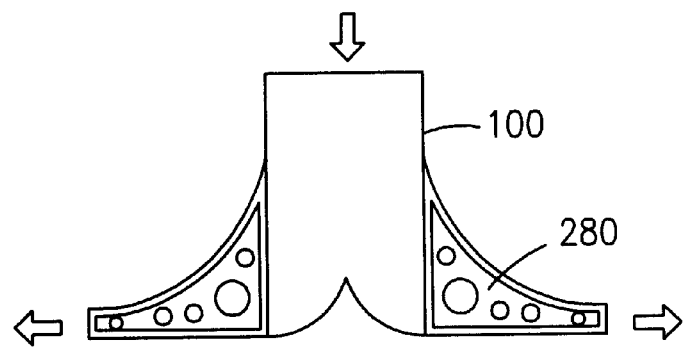

FIG. 11a—illustrates a sectional view of the exit duct of air or gas combustion that drives the flow radially toward the circular wing according to the present invention.

Figure 11B:
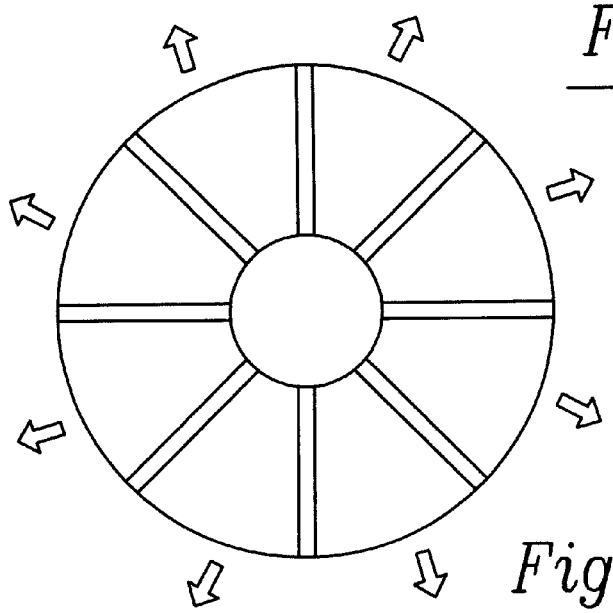
Figure 12A:
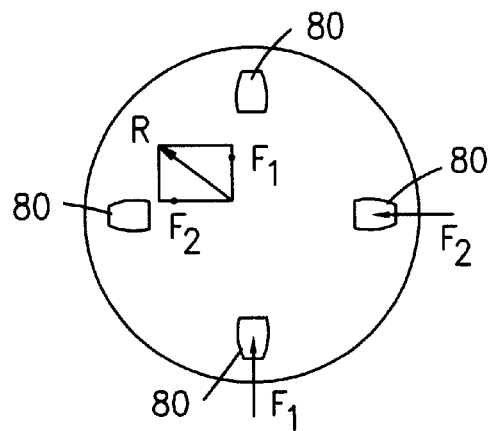
Figure 12B:
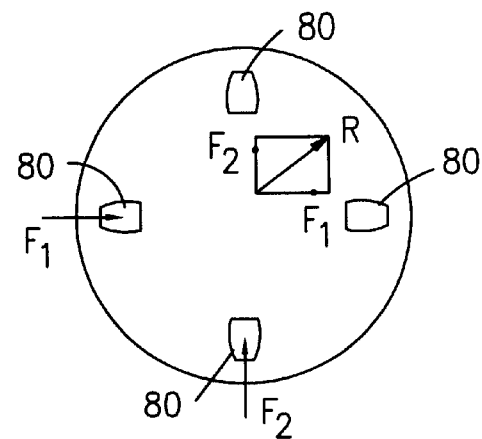
Figure 12C:
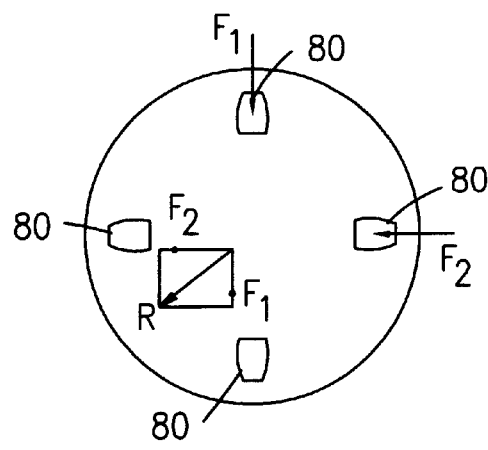
Figure 12D:
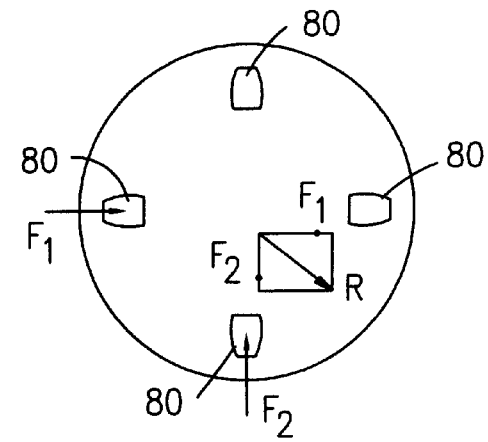

FIG. 11b illustrates a top view of the exit duct of air or gas combustion that drives the flow radially toward the circular wing according to the present invention.

FIGS. 12a–d—illustrates four combinations of different values of the forces.

Figure 13:
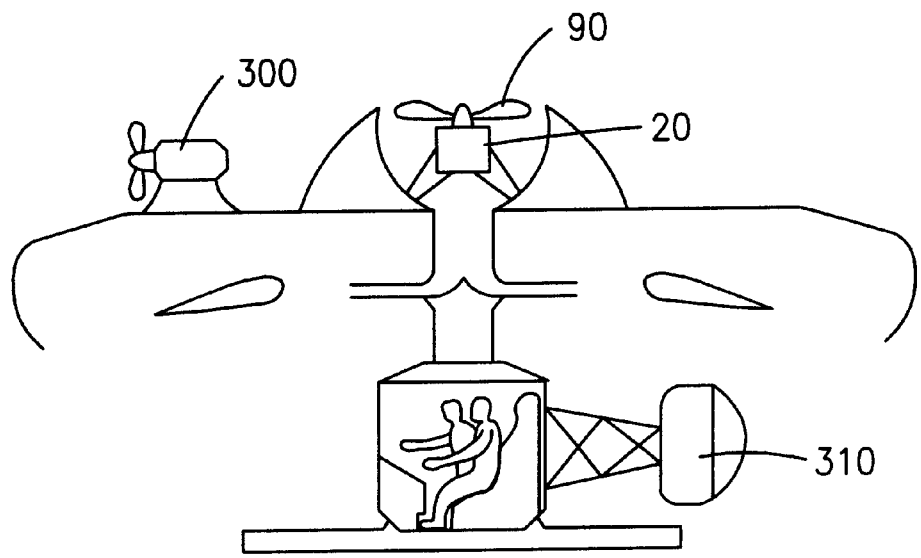

FIG. 13—illustrates a section view of the air transportation vehicle according to the present invention showing a main unit of internal combustion with a fan-screw propeller having a screw propeller aeronautical motor as a secondary propeller unit.

Figure 14:
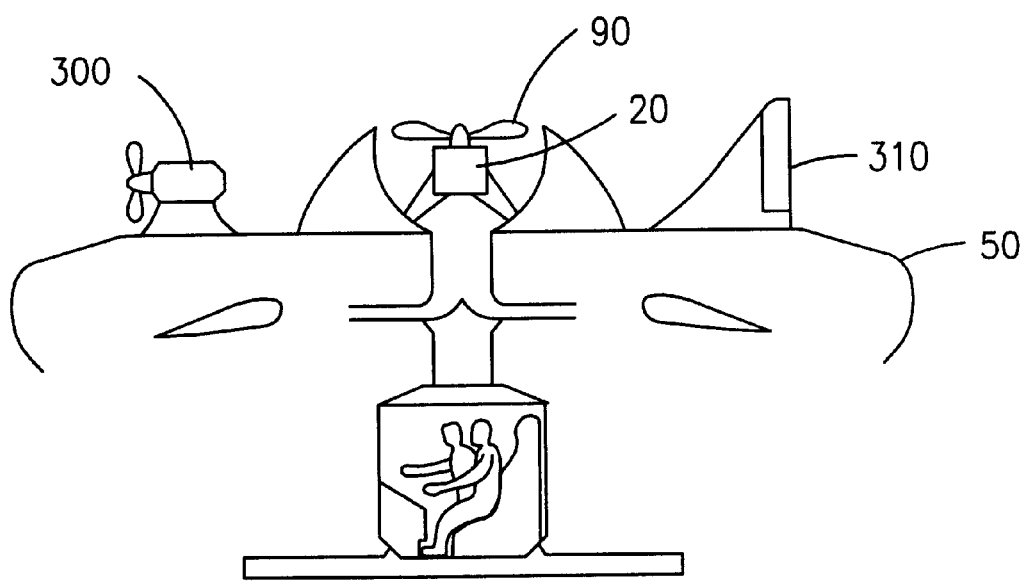

FIG. 14—illustrates a section view of the air transportation vehicle according to the present invention showing a main unit of internal combustion with a fan-screw propeller having a screw propeller aeronautical motor as a secondary propeller unit.

Figure 15A:
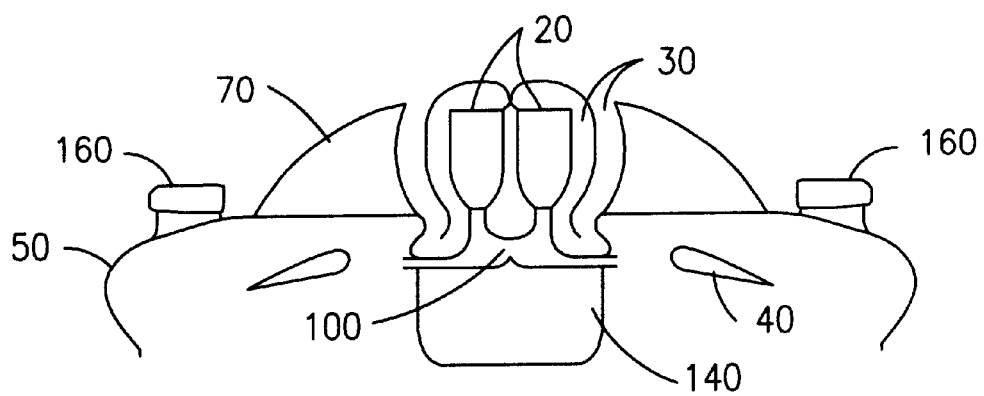

FIG. 15a illustrates a sectional view of the air transportation vehicle according to the present invention using two jet engines as main plants of flow generation for sustentation of a circular FVIS.

Figure 15B:
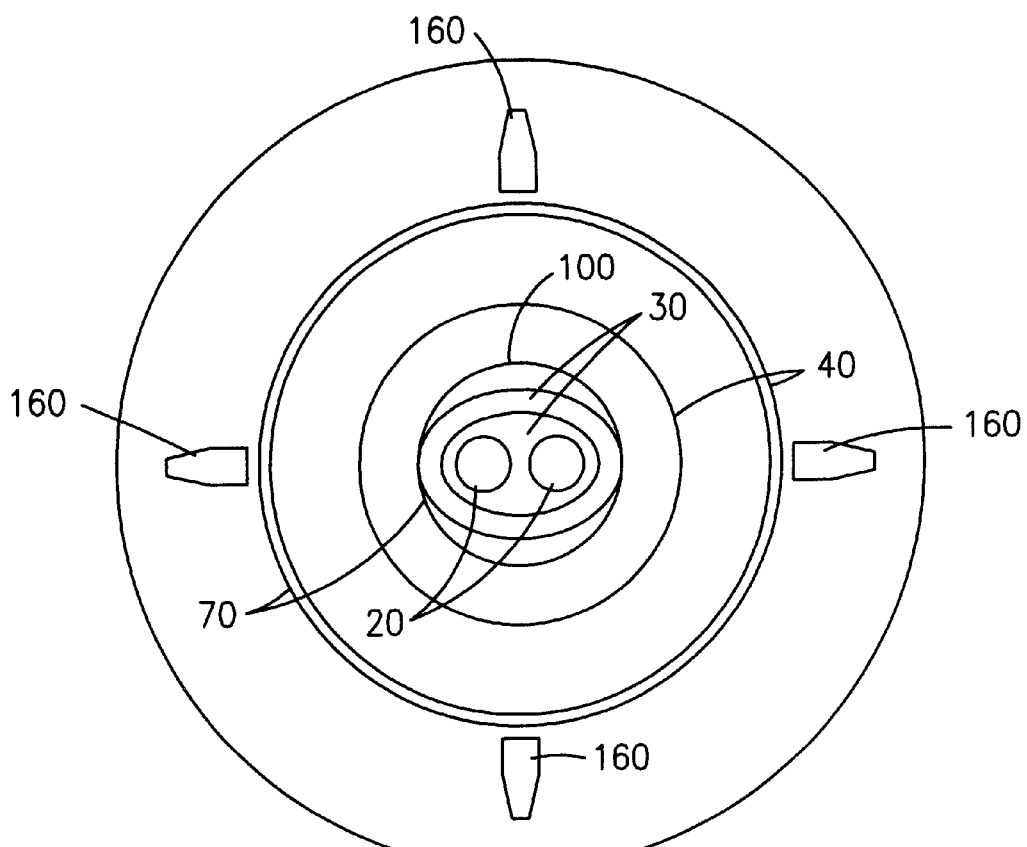

FIG. 15b—illustrates a top view of the air transportation vehicle according to the present invention using two jet engines as main plants of flow generation for sustentation of a circular FVIS.

Figure 16A:
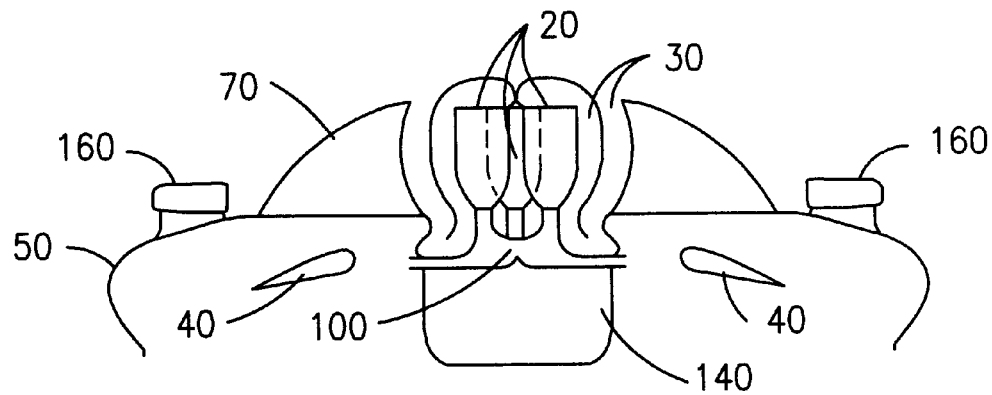

FIG. 16a illustrates a sectional view of of the air ransportation vehicle according to the present invention using three jet engines as main plants of flow generation for sustentation of a circular FVPS.

Figure 16B:
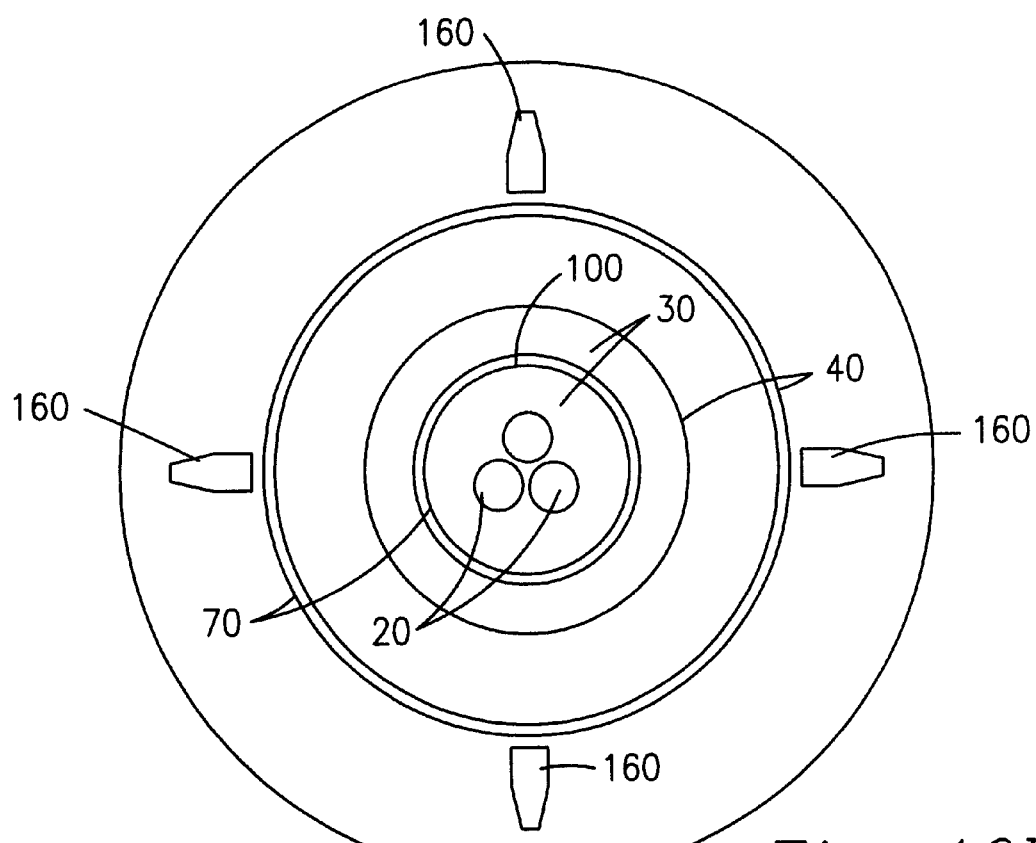

FIG. 16b—illustrates a top view of the air transportation vehicle according to the present invention using three jet engines as main plants of flow generation for sustentation of a circular FVIS.

Figure 17A:
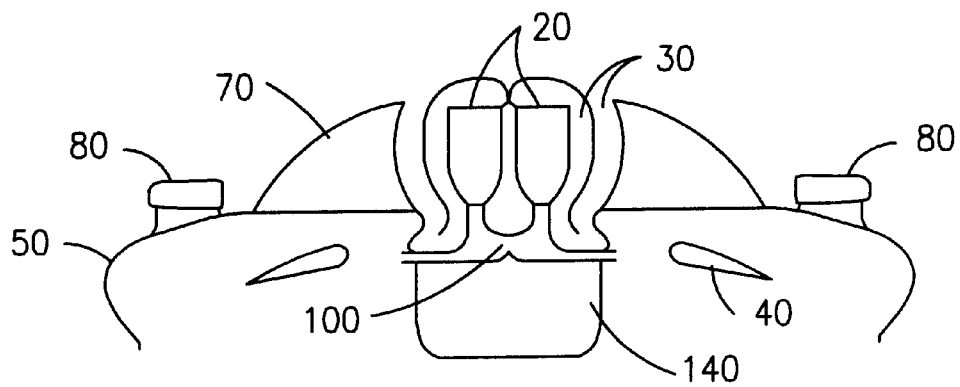

FIG. 17a illustrates a sectional view of of the air transportation vehicle according to the present invention using four jet engines as main plants of flow generation for sustentation of a circular FVIS.

Figure 17B:
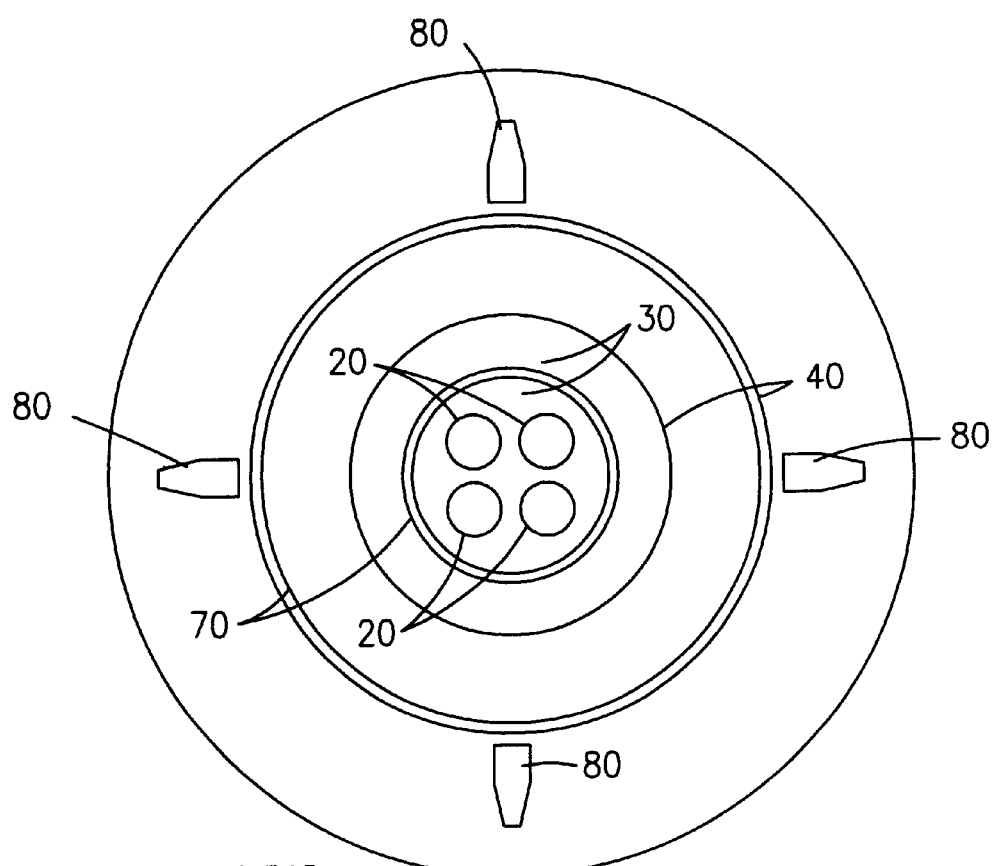

FIG. 17b—illustrates a top view of the air transportation vehicle according to the present invention using four jet engines as main plants of flow generation for sustentation of a circular FVIS.

Figure 18:
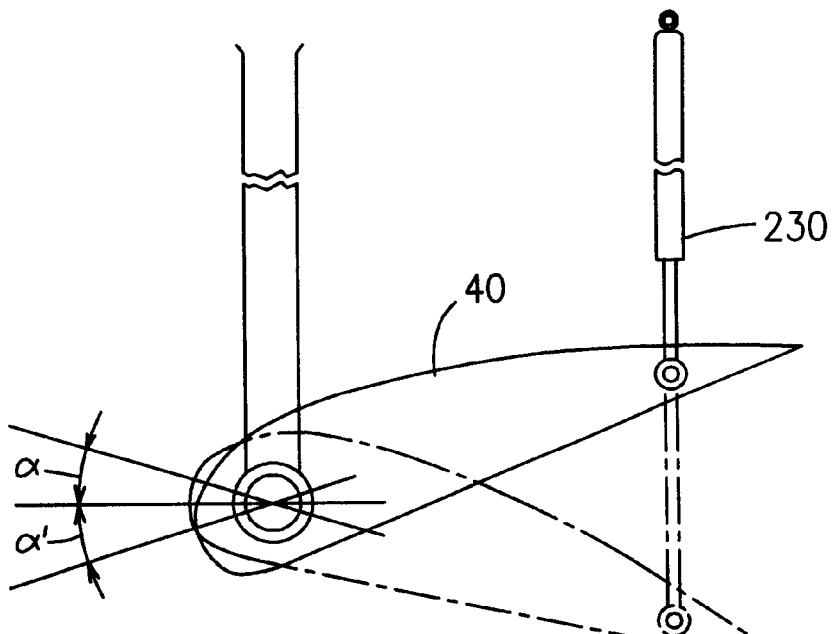

FIG. 18—illustrates the possibility to obtain "positive" or "negative" attack angles in each section of the circular wing by means of the use of the hydraulic pistons according to the present invention.

Figure 19A:
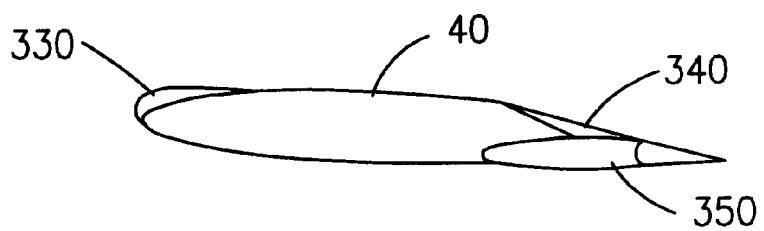

FIGS. 19a, b illustrate the possibility of using a hyper sustaining accessory in the circular wing according to the present invention.

Figure 20A:
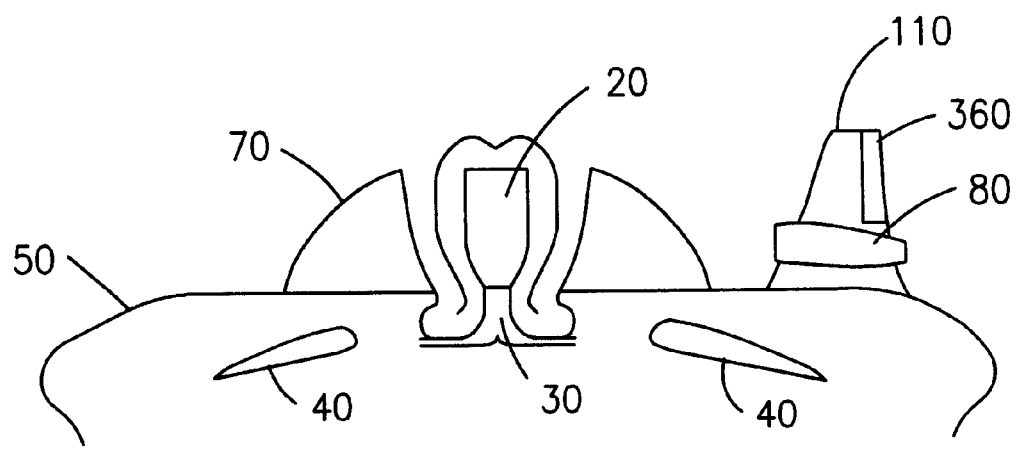

FIG. 20a illustrates a sectional view of of the air transportation vehicle according to the present invention using a single propeller jet engine mounted in the line of the vehicle having a modified wing to compensate an asymmetric distribution of weight.

Figure 20B:
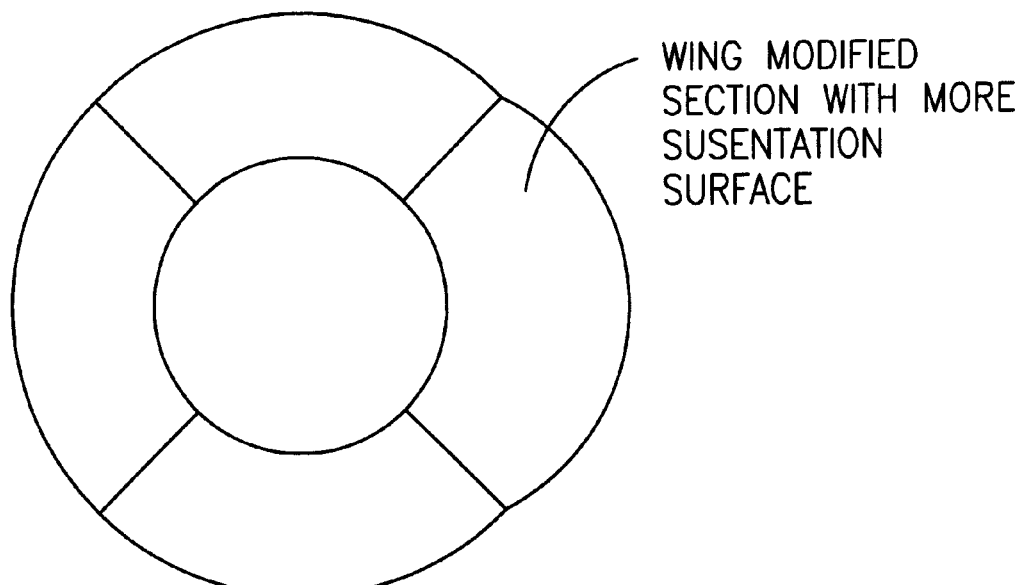

FIG. 20b—illustrates a top view of the air transportation vehicle according to the present invention using a single propeller jet engine mounted in the line of the vehicle having a modified wing to compensate an asymmetric distribution of weight.

Figure 21A:
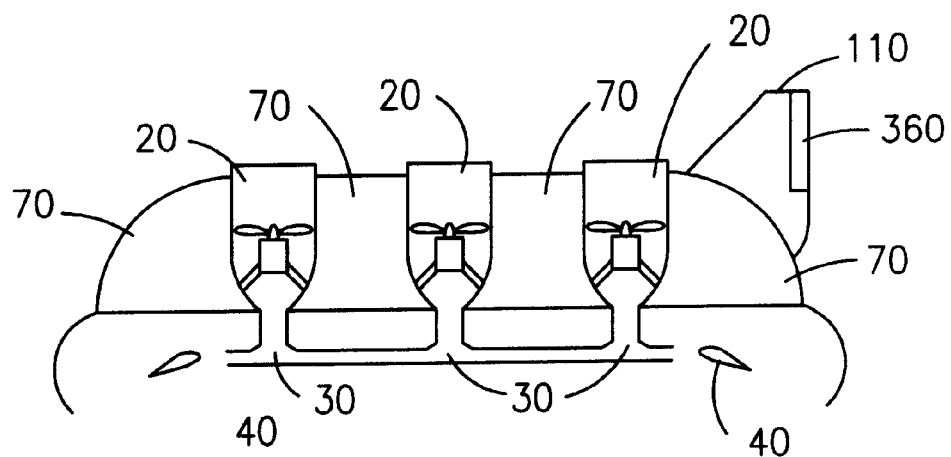

FIG. 21a illustrates a sectional view of of the air transportation vehicle according to the present invention having an oblong geometry with three main units of flow sustentation generation, two screw propeller motors as secondary units of propulsion, and a tail steering wheel.

Figure 21B:
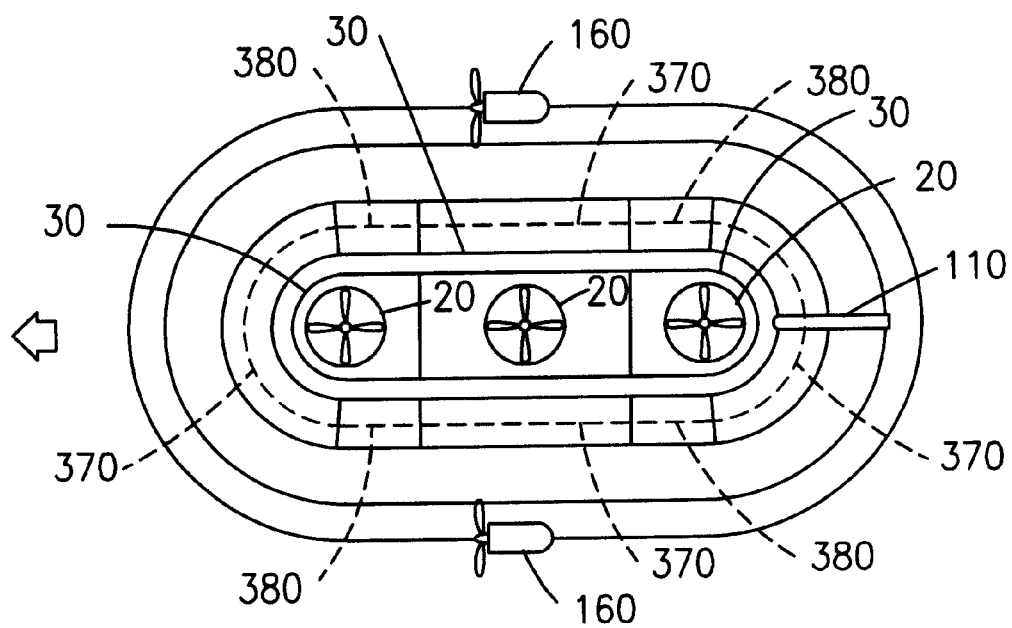

FIG. 21b—illustrates a top view of the air transportation vehicle according to the present invention having an oblong geometry with three main units of flow sustentation generation, two screw propeller motors as secondary units of propulsion, and a tail steering wheel.

Figure 22A:
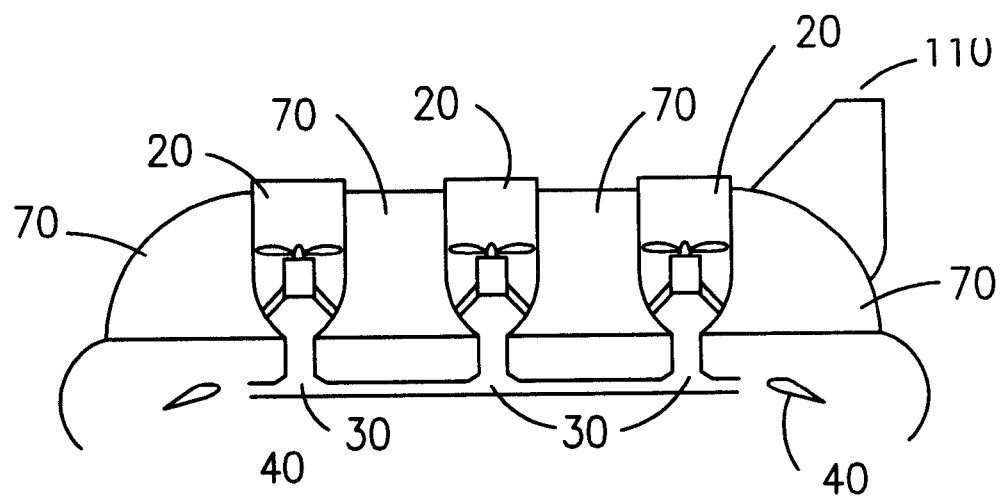

FIG. 22a illustrates a sectional view of of the air transportation vehicle according to the present invention having an oblong geometry with three main units of flow sustentation generation, two jet engines as secondary units of propulsion, and a tail steering wheel.

Figure 22B:
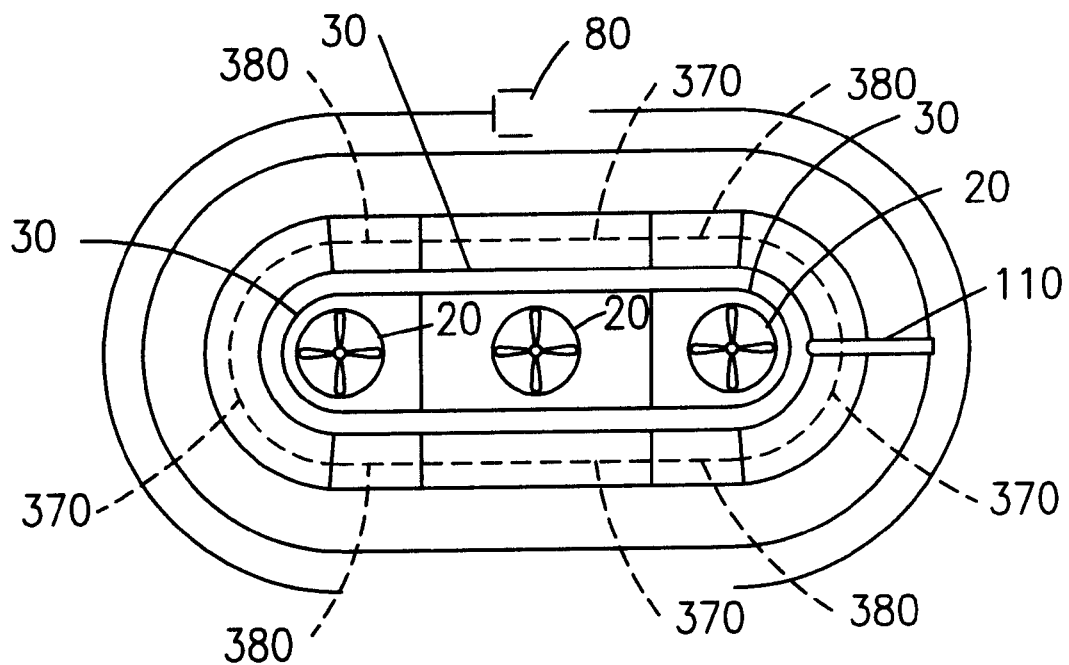

FIG. 22b—illustrates a top view of the air transportation vehicle according to the present invention having an oblong geometry with three main units of flow sustentation generation, two jet engines as secondary units of propulsion, and a tail steering wheel.

Figure 23A:
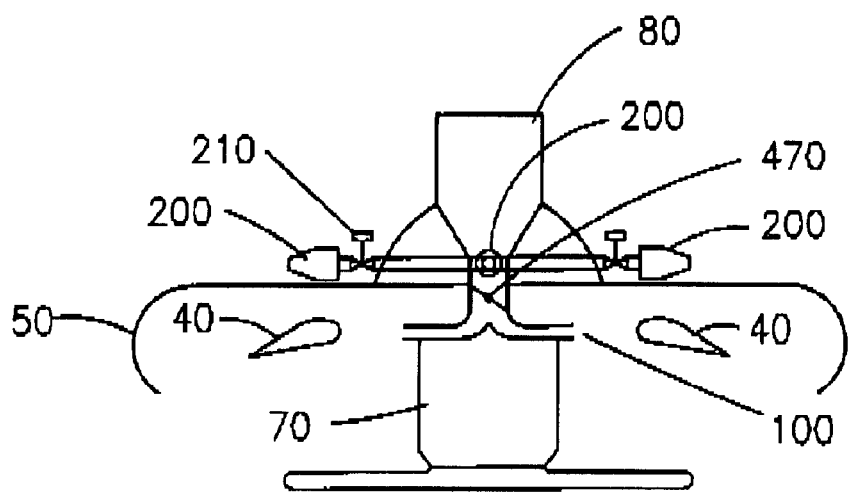

FIG. 23a illustrates a sectional view of of the air transportation vehicle according to the present invention having a jet engine as a main flow-generating unit, with four nozzles for derivation of part of the flow of combustion gases and electromagnetic valves controlled from the cockpit for horizontal propulsion.

Figure 23B:
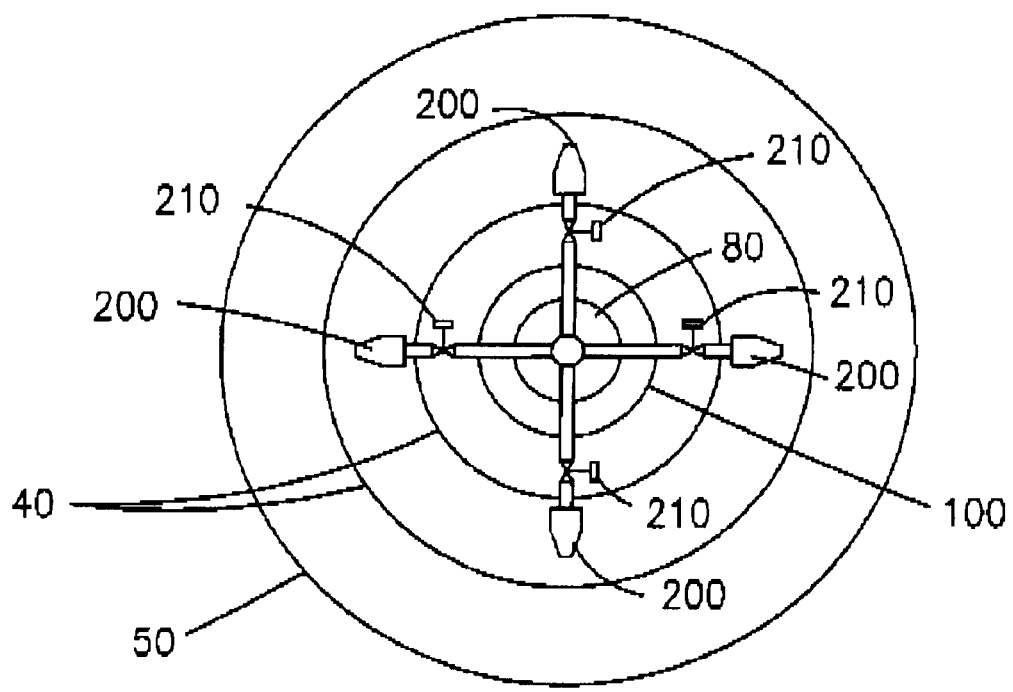

FIG. 23b—illustrates a top view of the air transportation vehicle according to the present invention having a jet engine as a main flow-generating unit, with four nozzles for derivation of part of the flow of combustion gases and electromagnetic valves controlled from the cockpit for horizontal propulsion.

Figure 24A:
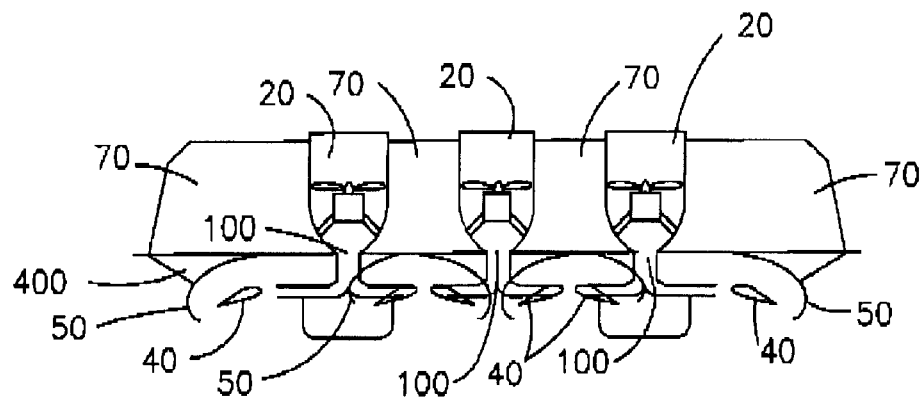

FIG. 24a illustrates a sectional view of of the air transportation vehicle according to the present invention having three independent units of sustentation united structurally to elevate a bigger fuselage.

Figure 24B:
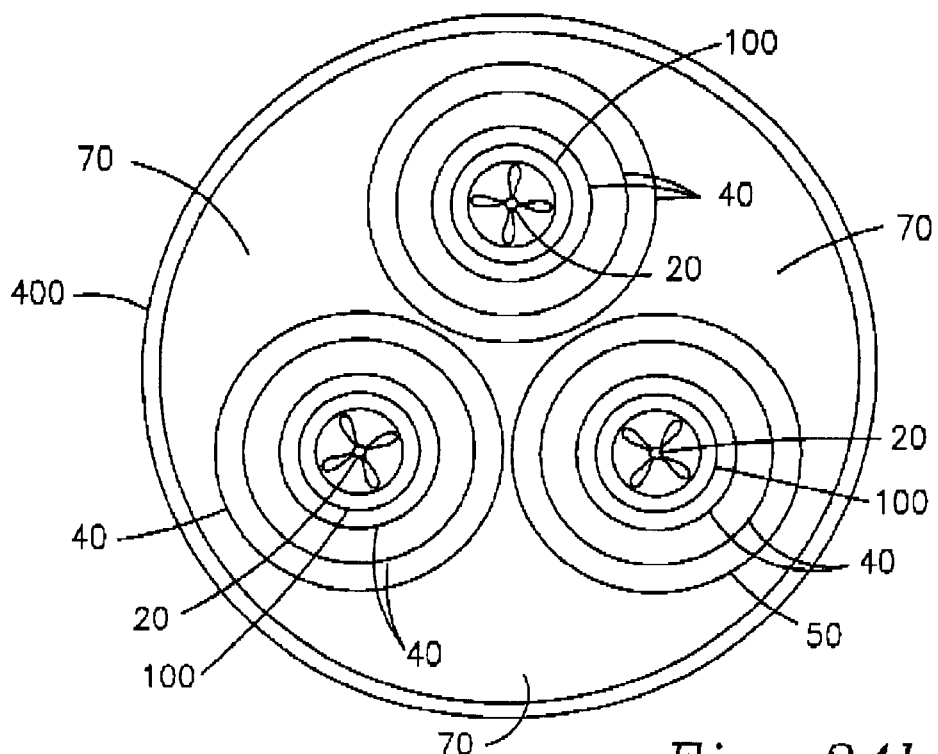

FIG. 24b—illustrates a top view of the air transportation vehicle according to the present invention having three independent units of sustentation united structurally to elevate a bigger fuselage.

Figure 25A:
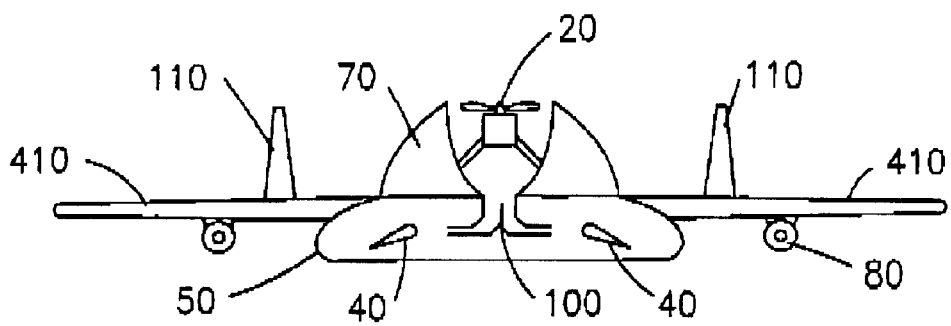

FIG. 25a illustrates a front view of of the air transportation vehicle according to the present invention having external wings to substitute in the sustentation to the flow generating group and a circular wing.

Figure 25B:
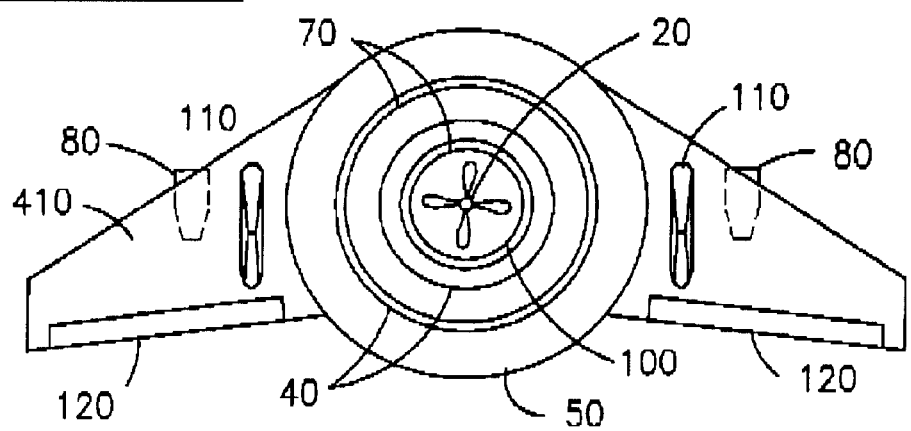

FIG. 25b—illustrates a top view of the air transportation vehicle according to the present invention having external wings to substitute in the sustentation to the flow generating group and a circular wing.

Figure 25C:
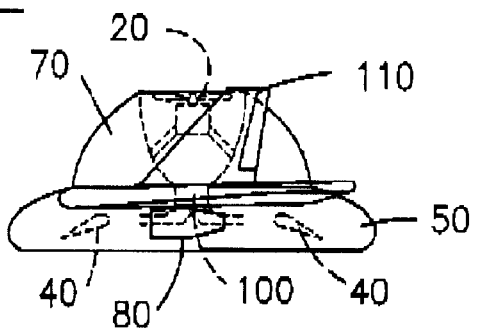

FIG. 25c—illustrates a side view of the air transportation vehicle according to the present invention having external wings to substitute in the sustentation to the flow generating group and a circular wing.

Figure 26A:
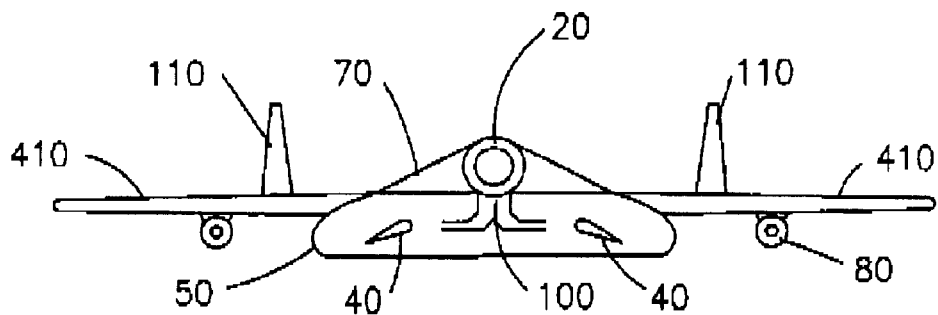

FIG. 26a illustrates a front view of of the air transportation vehicle according to the present invention having the main unit in horizontal position in a vehicle with external wings and circular wing. It includes section, top and side views.

Figure 26B:
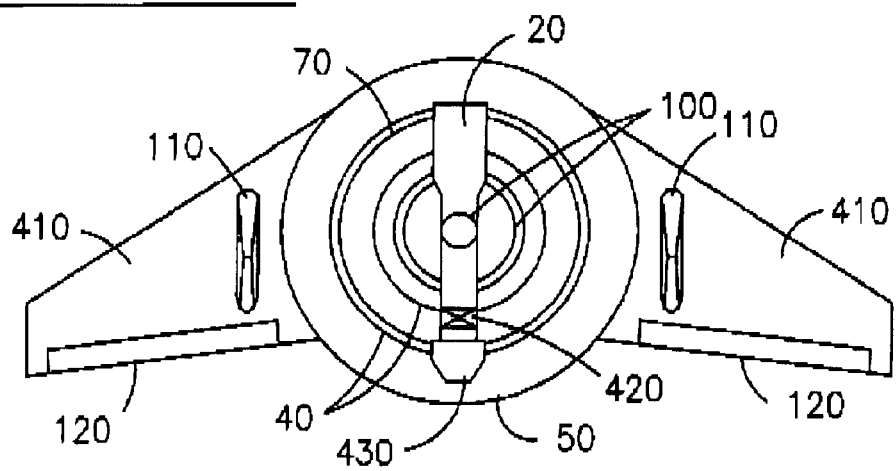

FIG. 26b—illustrates a top view of the air transportation vehicle according to the present invention having the main unit in horizontal position in a vehicle with external wings and circular wing. It includes section, top and side views.

Figure 26C:
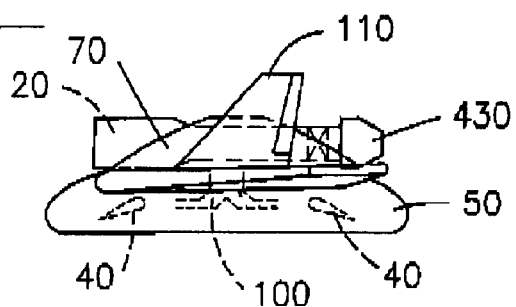

FIG. 26c—illustrates a side view of the air transportation vehicle according to the present invention having the main unit in horizontal position in a vehicle with external wings and circular wing. It includes section, top and side views.

Figure 27A:
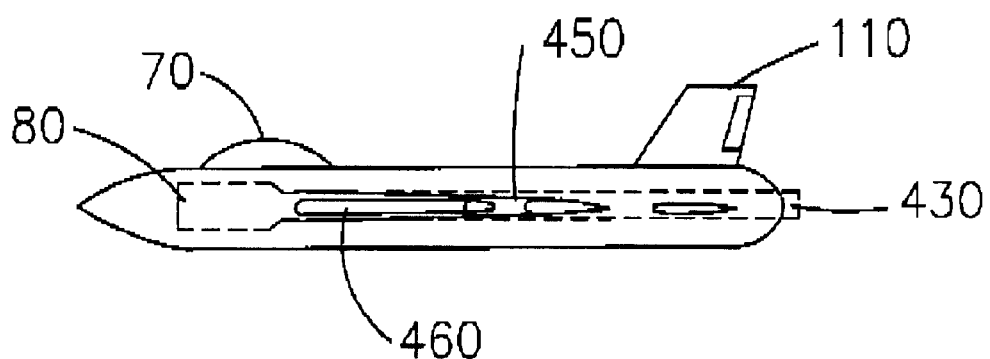

FIG. 27a illustrates a side view of the air transportation vehicle according to the present invention having the flow directly to the wings by means of lateral ducts.

Figure 27B:
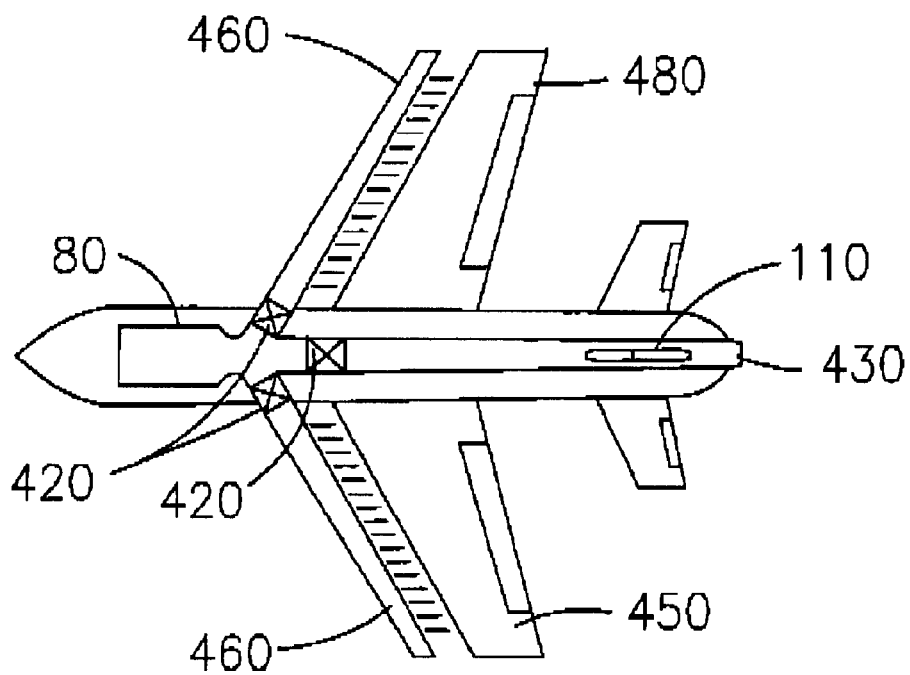

FIG. 27b—illustrates a top view of the air transportation vehicle according to the present invention having the flow directly to the wings by means of lateral ducts.

DETAILED DESCRIPTION OF THE INVENTION

The Flying Vehicle of Inverse Sustentation (FVIS) 10 is an air transport unit for passengers and cargo. It has vertical takeoff, due to a central airflow or gas escape directed radially toward a stable circular wing with regard to this flow by means of a duct designed for this purpose.

The title of the invention includes the term "inverse sustentation" because the flow is directed toward the wing and not the wing toward the air like happens in the airplane. It is understood that the effect of present reaction in the jet engine will help the elevation of the vehicle. Adding to the force of sustentation in the wing; the ideal performance will be when the consumption of fuel is the one required for the sustentation of an airplane in horizontal flight with an equivalent weight to the FVIS, that is, the work of sustentation will be made primarily by the circular wing. The duct of entrance of air has a curved surface of common separation with the escape gases for a double purpose; to cool these and to heat the air that enters to the jet engine.

The vehicle 10 consists in general of the following main parts:

- a main flow generating unit 20 to burn a mixture of fuel and air and produce a flow with an appropriate speed to archive the force of sustentation;
- an air admission duct 30 to receive the flow generated by the flow generating unit, the admission duct having a circular duct with a narrow exit to produce high speed flow;
- a circular wing 40 to directly receive the high speed flow and produce the necessary force for sustentation and elevation of the vehicle vertically, the circular wing having a traverse profile and an angle of attack divided in four sections, the circular wing being able to move independently or synchronized for each of the four sections in which it is divided;
- a protective cover 50 to protect the circular wing and direct the flow to the inferior part of the vehicle;
- a secondary unit of propulsion 60 for helping with the horizontal displacement of the vehicle, the secondary propulsion units installed on top or side of the vehicle;

a cockpit 70 for transporting passengers;
wherein the maneuverability and stability of the vehicle can be changed by changing the angle of attack of each section of the circular wing.

This provides the necessary force for sustentation and elevation of the vehicle vertically, considering that the speed of the flow, the dimensions of the wing, and the attack angle are the appropriate ones for the weight of the vehicle. Since the purpose of blowing the air or combustion gases on the circular wing is fundamentally to get sustentation, it is considered a circular duct of narrow exit because subsonic speeds of the flow will be managed.

The flow generating plant or main unit 20 can be selected from the group consisiting of a jet engine 80, an aeronautical motor of internal combustion and a screw propeller 90.

The present invention further comtemplates the use of an exit duct 100, a tail steering wheel 110 (when necessary), accessories such as generator, electric motors, valves, fuel tank, bomb of fuel, accumulator, hydraulic bomb, hydraulic pistons 120, and a cockpit of optional inferior maneuver 140.

When a jet engine 80 is used for generating the sustentation flow, the combustion is more complete than if a motor of internal combustion is use, thus the problem of soot emission, adherence in the circular wing, is avoided. It is preferably to use a jet engine of liquefied gas.

The main flow of sustentation can be achieved in different ways. Mainly, a flow of air or gas escape is generated to an appropriate speed to achieve the force of sustentation (Fs). If a gas escape is required for this purpose, a jet engine has been chosen as the most appropriate element. If a flow of air is required, a screw propeller (fan) ran by an aeronautical motor of internal combustion or a jet engine can be used.

FIGS. 6*a* and *b* show a sectional view and top view respectively of the air transportation vehicle according to the present invention using a jet engine like a flow-generating plant of escape gases for the sustentation. The flow generating plant, or main propeller unit 20, such as a jet engine, burns a mixture of fuel and air that enters into the admission duct 30. These escape gases are directed by means of a circular duct 130 or nozzle of narrow exit, to win speed, toward the circular wing 40. The circular wing 40 has a transverse profile similar to that of the wing of an airplane, and an angle of attack variable regarding to the current of gases received (FIGS. 9*a*–*b* and 18).

In FIGS. 6*a*–*b*, the admission duct of air 30 is set so that a sector shares a common surface with the gas exit duct 130, to heat the admission air and to cool the escape gases In this embodiment, the present invention further includes a main unitary circular Axis 150 of the circular wing 40, a secondary propulsion Units 160, an electric power Generator 170 propelled by the axis of a jet engine, accessories 120 such as electric Motor(s), fuel bomb, accumulators, and hydraulic bomb, a circular Fuel Tank 180 (toroidal), an inferior cockpit of maneuver 140, and a secondary circular segmented Axis 190.

FIGS. 7*a*–7*b*—illustrate a sectional and top view respectively of the air transportation vehicle according to the present invention using an aeronautical motor of internal combustion as an airflow generating plant for the sustentation.

In this embodiment the present invention further includes nozzles of exiting gas escape 200, electromagnetic valves 210 controlled from the cockpit for regulation of gas escape flow, and jet engine gas escape tubes 220.

FIGS. 8*a*–*b*—illustrate a sectional and a top view respectively of the air transportation vehicle according to the present invention using a jet engine as an airflow-generating plant for sustentation.

Considering the application of the vehicle, it will be possible to use, as a flow-generating unit, an air aeronautical motor of internal combustion with a screw propeller or a jet engine that propels a screw propeller. In this case, the vehicle is simplified because it will be possible to manufacture without the admission duct, just as it is shown in FIGS. 7*a*–*b* and 8*a*–*b*, the same is tru when a jet engine is used for obtaining the gas escape flow. In this case, the reaction generated in the screw propeller will help to the sustentation thus the ideal performance for the sustentation is assumed fundamentally by the circular wing. That is, the screw propeller of the main unit will act as a fan.

If a jet engine is used to move the screw propeller, it is good to consider the possibility of deriving the flow of gas escape to four points to 90°, to generate horizontal movement by means of nozzles of flow regulated with electromagnetic valves. Each of the nozzles will be able to assume the complete flow of gases of the jet engine, this way, up to three of them can be closed simultaneously. Any orientation can be obtained by the combination of flows of the four nozzles, controlling the regulation of openings of the valves from the cockpit. (FIGS. 8 and 12).

According to the size or capacity of the vehicle, it will be possible to use one, two, or more main flow generating units. In that way, it will be possible to apply the invention to the production of vehicles for personal or group transport or for cargo transport of heavy load or passengers in general (FIGS. 13, 14, 15, 16, and 17).

The cover 50 protects the wing, achieving with it an independence of the external factors, directing the flow of air or gases once used toward the inferior part of the vehicle. The cover is located at an enough vertical and diametrical distance, so it won't interfere with the effect of sustentation in the circular wing. The global effect of this location is to provide a controlled site of the sustentation, like it was said, independent of external factors as weather conditions.

A constant flow of air or gases will be gotten for the sustentation and a control of the ascent speed, depending on the quantity of fuel given to the jet engine or motor and the attack angle in the elected circular wing. An additional function of the cover is to protect the effect of the flow generated by the main propeller unit of the contrary currents generated in the air when moving the vehicle horizontally in any direction.

The cockpit 70 is made of transparent material, usually of one piece or can be cut if the application demands it.

The horizontal displacement of the vehicle will be gotten by means of the installation of diverse propellers, in quantity and position required. According to the use, a screw propeller can be placed and a tail steering wheel, two screw propellers in the external sides or two jet engines, or a jet engine with the back steering wheel in the tail.

In the event of using a jet engine as a main unit, the possibility to derive part of the main flow of gases toward four nozzles located at 90° should be considered. With controllable valves to get a displacement in any direction, it is a small vehicle that requires little displacement speed. This location must include a wing nut valve 470 that regulates the flow of escape gases (FIG. 23).

For a strategic vehicle, a location of four propeller jet engines at equally 90° will provide, in combination with the control of the attack angle of the wing a maneuverability impossible to obtain nowadays in any well-known vehicle. This can be useful to avoid obstacles or projectiles of any type, being able to automate the maneuvers of the vehicle if it is required.

For a bigger vehicle, several circular wings can be used with its main flow-generating unit joined structurally to elevate a bigger unitary fuselage (FIG. 24).

The structure of the vehicle can be changed according to its application, since it is not indispensable for a circular geometry to get the effect of sustentation. By means of an appropriate location of the main flow-generation unit and a wing geometry that can have some attached sections if necessary (FIG. 22), the form of the vehicle can be changed in diverse ways, applying the same exposed principle. Consequently, the quantity of main and secondary propulsion units can be changed according to the requirements, as well as the geometry of the vehicle, the geometry of the wing, or the number of sections in which it is divided, mobile or firm.

The versatility of the vehicle allows considering the insertion of some external wings to replace in the sustentation to the internal circular wing in horizontal displacement. For an identical work to the one of an airplane when reached the secondary units of propulsion an appropriate horizontal speed, that is, the speed of minimum sustentation for these external wings, if it is wanted this way. (FIG. 25) For this configuration of external wings, it is also possible to install the main flow-generating unit in horizontal position, if you want to reduce the height of the fuselage 400 with aerodynamic purposes and to do without the secondary unit of horizontal propulsion. This configuration requires two synchronized electromagnetic valves that regulate the flow trough that the flow can be directed toward the circular wing or toward the back nozzle 430, for the vertical takeoff and for the horizontal advance. It is clear that the synchronization of the valves consists on a simultaneous work, but while one closes, the other opens up in the same proportion, so that after the vertical takeoff, the change should be smooth to the regime of horizontal sustentation. The sustentation will be given by the circular wing to the external wings 410 as soon as the vehicle gets enough speed for sustentation and given totally when the minimum speed of horizontal sustentation is acquired (FIG. 26).

It can also be applied the principle from the invention to a conventional airplane to achieve their vertical takeoff, doing it without the circular wing and directing the flow directly toward the conventional wings 450 by means of a couple of ducts 460 located in front of them. The ducts have in a traverse section horseshoe form, with the opening directed toward the wing, obtaining this way a current of sustentation in all the longitude of the wings. After the vertical takeoff, the flow can be directed toward the back nozzle opening the rear regulator valve and closing the valves of the lateral duct little by little, until obtaining in horizontal displacement the minimum speed of sustentation for the wings. (FIG. 27)

The accessories 120, like; accumulators, electric motors, hydraulic and other bombs, can be located in the circular space between the cockpit and the air entrance duct, while the circular tank of fuel can be located in the space around the exit duct, as an option.

The vehicle offers the possibility to install optionally an interior cockpit for maneuver 140, when it is required this way, which will be able to carry, hoist equipment for rescue operations or for load transport.

FIG. 9a illustrates a top view of the circular wing. The circular wing comprises hydraulic pistons 230, a main circular unitary axis 150, and a secondary segmented circular axis 190.

FIG. 9b illustrates a sectional view of FIG. 9a taken along lines A–A'. The Figure further shows a fuselage protective cover 240, an articulation 250, bearings 260, and protective cover 270 for the hydraulic piston 230.

FIG. 9c illustrates a sectional view of FIG. 9a taken along lines B–B'. FIG. 9d illustrates a sectional view of FIG. 9a taken along lines C–C'.

This wing, as it is circular, provides a great surface of sustentation in little space, granting the possibility to have a compact vehicle with great load capacity.

FIGS. 11a–b illustrate a sectional and top view respectively of the exit duct of air or gas combustion that drives the flow radially toward the circular wing according to the present invention. The figures further show a lighten plate of structural joint 280.

FIG. 12 illustrates how a displacement can be obtained with the combination of escape flows in the present invention having the gas escape directed to four nozzles located at 90° or four jet engines having, four jet engines propellers equally set to 90°.

FIGS. 13a–b illustrate a section and top view view respectively of the present invention having a main unit of internal combustion 20 with a fan-screw propeller 90, a screw propeller aeronautical motor 300 as a secondary propeller unit, and an inferior tail steering wheel 310, embedded to the cockpit.

FIG. 14 illustrates a section view of the present invention having a main unit of internal combustion 20 with a fan-screw propeller 90, a screw propeller aeronautical motor as a secondary propeller unit 300, and an inferior tail steering wheel 310, mounted on the protective cover 50.

FIG. 18—Illustrates the possibility to obtain "positive" or "negative" attack angles in each section of the circular wing by means of the use of the hydraulic pistons according to the present invention.

The ascension speed of the vehicle will depend on the attack angle of the wing, besides the régime of the motor or turbine that will generate a flow of variable speed wished. That is, if you want to elevate the unit more or less quickly, an attack angle of more or smaller value will be granted for each of the wing sections. The movement of each section is gotten by means of hydraulic pistons whose control valves are commanded from the cockpit. The hydraulic bomb that provides pressure to the pistons is moved by an electric motor that receives energy of a generator moved by the, axis of the main unit, this could be a jet engine or an aeronautical combustion motor. The normal value of variation of the attack angle varies among 2° to 12°, however, for strategic reasons, it can be inclusive of "negative" value. (Above the horizontal plane) This is in order to get an evasive maneuver down, evidently providing to each wing section the same angle value to get a stable movement.

FIGS. 11a–b illustrate a sectional and top view respectively of the exit duct that drives the flow radially toward the circular wing according to the present invention. The figures further show a lighten plate of structural joint 260.

Figure 19B:
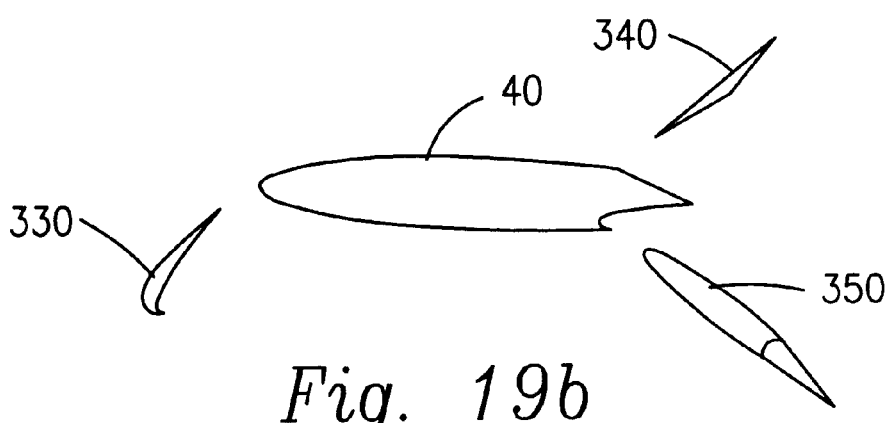

FIGS. 19a–b illustrate the possibility of using a hyper sustaining accessory in the circular wing according to the present invention. Some of the accessories can be selected from the group consisting of slat 330, spoiler 340, flat 350, and combination thereof, always in function of the maneuverability requirements according to the application of the vehicle.

FIGS. 20a–b shows the option of modifying the geometry of the circular wing to compensate an asymmetric distribution of weight, in this case a single propeller jet engine 80 mounted in the line of the vehicle. The geometry of the wing seen from a top view can be varied according to necessity, considering the distribution of weight in the vehicle, for example, in the case of placing a secondary jet engine that propels in the tail (FIG. 20).

FIGS. 21a–b show the possibility to use the principle of the invention in a non-circular geometry; in this case assuming an oblong geometry with three main units 20 of flow sustentation generation, two screw propeller motors 160 as secondary units of propulsion and a tail steering wheel 360.

The circular wing 40 is divided in four mobile sections 370 and four firm sections 380. Its movement is good to modify the attack angle, with which an appropriate maneuverability degree will be possible to compensate any factor of uncertainty, like an inclined blast of wind.

The four sections of the wing will be able to move in an independent or synchronized way, according to the necessities.

FIGS. 22a–b illustrate a sectional and top view respectively of of the air transportation vehicle according to the present invention having an oblong geometry with three main units of flow sustentation generation, two jet engines as secondary units of propulsion, and a tail steering wheel.

FIGS. 23a–b illustrate a sectional and top view respectively of of the air transportation vehicle according to the present invention having a jet engine as a main flow-generating unit, with four nozzles for derivation of part of the flow of combustion gases and electromagnetic valves 420 controlled from the cockpit for horizontal propulsion.

The Figures show details of installation of the wing with the main unitary circular axis and the segmented secondary circular axis with hydraulic pistons for modification of the attack angle. (Section a—a), bearing installation details in a main unitary axis (Section b—b) and details of installation of hydraulic pistons together to segmented axes with bearings for modification of the attack angle (Section c—c).

FIGS. 24a–b illustrate a sectional and top view respectively of of the air transportation vehicle according to the present invention having three independent units of sustentation united structurally to elevate a bigger fuselage.

FIGS. 25a–c illustrate a front, top, and side view respectively of of the air transportation vehicle according to the present invention having external wings to substitute in the sustentation to the flow generating group and a circular wing.

FIGS. 26a–c illustrate a front, top, and side view of of the air transportation vehicle according to the present invention having the main unit in horizontal position in a vehicle with external wings and circular wing. It includes section, top and side views.

FIG. 27a illustrates a side view of of the air transportation vehicle according to the present invention having the flow directly to the wings by means of lateral ducts.

While embodiments of this invention are illustrated and disclosed, these embodiments should not be construed to limit the claims. It is anticipated that various modifications and alternative designs may be made without departing from the scope of this invention.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An inverse sustentation air transport vehicle for passengers and cargo, the vehicle comprising:
   a main flow generating unit to burn a mixture of fuel and air and produce a gas flow with an appropriate speed to achieve the force of sustentation;
   an air admission duct to receive the flow generated by the flow generating unit, the admission duct having a circular duct with a narrow exit to produce high speed flow;
   a circular wing to directly receive the high speed flow and produce the necessary force for sustentation and elevation of the vehicle vertically, the circular wing having a transverse profile and an angle of attack divided in four sections, the circular wing being able to move at least one of independently and synchronized for each of the four sections in which it is divided;
   a protective cover to protect the circular wing and direct the flow to the inferior part of the vehicle;
   at least one secondary propulsion unit for helping with the horizontal displacement of the vehicle, each secondary propulsion unit is installed at least in one of top and side of the vehicle;
   a cockpit for transporting passengers;
   wherein the maneuverability and stability of the vehicle can be changed by changing the angle of attack of each section of the circular wing.

2. An inverse sustentation air transport vehicle according to claim 1, further comprising two hydraulic pistons in each of the sections of the circular wing for giving movement to each of the sections of the circular wing.

3. An inverse sustentation air transport vehicle according to claim 1, wherein having the same angle of attack in the four sections of the wing provides an ascended speed.

4. An inverse sustentation air transport vehicle according to claim 1, wherein having a negative angle of attack in the four sections of the wing provides a descend speed.

5. An inverse sustentation air transport vehicle according to claim 1, wherein the main flow generating unit is selected from the group consisting of aeronautical motor of internal combustion, jet engine, and screw propeller.

6. An inverse sustentation air transport vehicle according to claim 1, wherein the vehicle takeoff is in a vertical way.

7. An inverse sustentation air transport vehicle according to claim 1, wherein the secondary propulsion unit is selected from the group consisting of a screw propeller and a jet engine.

8. An inverse sustentation air transport vehicle according to claim 1, wherein the flow-generating unit can be installed in a horizontal position.

9. An inverse sustentation air transport vehicle according to claim 1, wherein the main flow-generating unit comprises a motor of internal combustion and a screw propeller.

10. An inverse sustentation air transport vehicle according to claim 1, wherein the main flow-generating unit comprises a jet engine.

11. An inverse sustentation air transport vehicle according to claim 1, further including a tail steering wheel joined to the cockpit.

12. An inverse sustentation air transport vehicle according to claim 1, further including a steering wheel located on top of the protective cover.

13. An inverse sustentation air transport vehicle according to claim 1, wherein the main flow-generating unit comprises at least two jet engines.

14. An inverse sustentation air transport vehicle according to claim 1, wherein the circular wing further comprises at least one hyper-supporting accessory selected from the group consisting of slat, spoiler and flap.

15. An inverse sustentation air transport vehicle according to claim 1, wherein the vehicle further comprises three main flow generating units and two secondary propulsion units.

16. An inverse sustentation air transport vehicle according to claim 1, wherein a geometric of the circular wing is modified to compensate for an asymmetric distribution of weight.

17. An inverse sustentation air transport vehicle according to claim 1, wherein the secondary propulsion unit comprises four units spaced equally at 90°.

18. An inverse sustentation air transport vehicle according to claim 1, wherein the main flow-generating unit further comprises four nozzles spaced equally at 90°.

19. An inverse sustentation air transport vehicle according to claim 1, wherein the main flow-generating unit comprises a motor of internal combustion, a screw propeller and four nozzles, wherein the nozzles are spaced equally at 90°.

20. An inverse sustentation air transport vehicle according to claim 1, wherein the angle of attack is negative.

21. An inverse sustentation air transport vehicle for passengers and cargo, the vehicle comprising:

a main flow generating unit to burn a mixture of fuel and air and produce a gas flow with an appropriate speed to achieve the force of sustentation;

an air admission duct to receive the flow generated by the flow generating unit, the admission duct having a circular duct with a narrow exit to produce high speed flow;

a circular wing to directly receive the high speed flow and produce the necessary force for sustentation and elevation of the vehicle vertically, the circular wing having a transverse profile and an angle of attack divided in four sections, the circular wing being able to move at least independently and synchronized for each of the four sections in which it is divided;

a protective cover to protect the circular wing and direct the flow to the interior part of the vehicle;

at least one secondary propulsion unit for helping with the horizontal displacement of the vehicle, each secondary propulsion unit is installed at least in one of top and side of the vehicle;

a cockpit for transporting passengers;

wherein the maneuverability and stability of the vehicle can be changed by changing the angle of attack of each section of the circular wing; and wherein the circular wing further comprises several circular wings with their respective main flow-generation units to elevate a large vehicle.

* * * * *